United States Patent
Kato et al.

(10) Patent No.: US 9,905,875 B2
(45) Date of Patent: Feb. 27, 2018

(54) REDOX FLOW SECONDARY BATTERY AND ELECTROLYTE MEMBRANE FOR REDOX FLOW SECONDARY BATTERY

(71) Applicant: ASAHI KASEI KABUSHIKI KAISHA, Tokyo (JP)

(72) Inventors: Akihiro Kato, Tokyo (JP); Naoto Miyake, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 6 days.

(21) Appl. No.: 14/368,086

(22) PCT Filed: Dec. 27, 2012

(86) PCT No.: PCT/JP2012/083953
§ 371 (c)(1),
(2) Date: Jun. 23, 2014

(87) PCT Pub. No.: WO2013/100083
PCT Pub. Date: Jul. 4, 2013

(65) Prior Publication Data
US 2014/0370404 A1    Dec. 18, 2014

(30) Foreign Application Priority Data

Dec. 28, 2011  (JP) .................. 2011-290020
Jan. 20, 2012  (JP) .................. 2012-010454

(51) Int. Cl.
*H01M 8/20*    (2006.01)
*H01M 8/18*    (2006.01)
(Continued)

(52) U.S. Cl.
CPC .......... *H01M 8/188* (2013.01); *C08J 5/2287* (2013.01); *C08L 27/18* (2013.01); *H01B 1/122* (2013.01);
(Continued)

(58) Field of Classification Search
None
See application file for complete search history.

(56) References Cited

U.S. PATENT DOCUMENTS 4,421,579 A    12/1983  Covitch et al.
5,599,614 A    2/1997   Bahar et al.
(Continued)

FOREIGN PATENT DOCUMENTS

CN    102024928 A    4/2011
EP    0790658 A2     8/1997
(Continued)

OTHER PUBLICATIONS

European search report issued with respect to application No. 12863252.8, dated May 8, 2015.
(Continued)

*Primary Examiner* — Daniel Gatewood
(74) *Attorney, Agent, or Firm* — Greenblum & Bernstein, P.L.C.

(57) ABSTRACT

This redox flow secondary battery has an electrolyte tank (6) containing: a positive electrode cell chamber (2) containing a positive electrode (1) comprising a carbon electrode; a negative electrode cell chamber (4) containing a negative electrode (3) comprising a carbon electrode; and an electrolyte membrane (5) as a barrier membrane that separates/isolates the positive electrode cell chamber (2) and the negative electrode cell chamber (4). The positive electrode cell chamber (2) contains a positive electrode electrolyte containing an active substance, the negative electrode cell chamber (4) contains a negative electrode electrolyte containing an active substance, and the redox flow secondary battery charges and discharges on the basis of the change in valency of the active substances in the electrolytes. The electrolyte membrane (5) contains an ion exchange resin composition that is primarily a polyelectrolyte polymer, and
(Continued)

the electrolyte membrane (5) has a reinforcing material comprising a fluorine-based porous membrane.

10 Claims, 1 Drawing Sheet

(51) Int. Cl.
  C08L 27/18 (2006.01)
  H01B 1/12 (2006.01)
  H01M 8/1023 (2016.01)
  H01M 8/0239 (2016.01)
  H01M 8/0241 (2016.01)
  H01M 8/0293 (2016.01)
  H01M 8/1039 (2016.01)
  H01M 8/1058 (2016.01)
  C08J 5/22 (2006.01)
  H01M 8/0289 (2016.01)

(52) U.S. Cl.
  CPC ....... *H01M 8/0239* (2013.01); *H01M 8/0241* (2013.01); *H01M 8/0289* (2013.01); *H01M 8/0293* (2013.01); *H01M 8/1023* (2013.01); *H01M 8/1039* (2013.01); *H01M 8/1058* (2013.01); *H01M 8/20* (2013.01); *C08J 2327/18* (2013.01); *H01M 2300/0082* (2013.01); *Y02E 60/528* (2013.01)

(56) References Cited

U.S. PATENT DOCUMENTS

| | | | |
|---|---|---|---|
| 5,759,711 | A | 6/1998 | Miyabayashi |
| 6,461,772 | B1 | 10/2002 | Miyake et al. |
| 2004/0099527 | A1 | 5/2004 | Nakayama et al. |
| 2006/0063903 | A1 | 3/2006 | Kasahara et al. |
| 2006/0141315 | A1* | 6/2006 | Murata ............ C08L 71/02 429/483 |
| 2006/0180796 | A1* | 8/2006 | Adachi ............. C09K 5/20 252/500 |
| 2007/0202377 | A1 | 8/2007 | Hommura et al. |
| 2008/0292964 | A1* | 11/2008 | Kazacos ............ B60L 11/1879 429/231.5 |
| 2011/0318669 | A1 | 12/2011 | Miyake et al. |
| 2012/0045680 | A1 | 2/2012 | Dong et al. |
| 2012/0135278 | A1 | 5/2012 | Yoshie et al. |
| 2012/0178017 | A1 | 7/2012 | Murai et al. |
| 2013/0045400 | A1 | 2/2013 | Dong et al. |
| 2014/0113888 | A1 | 4/2014 | Crater et al. |
| 2014/0120431 | A1 | 5/2014 | Roelofs et al. |

FOREIGN PATENT DOCUMENTS

| | | | |
|---|---|---|---|
| EP | 1011158 | A1 | 6/2000 |
| GB | 2426763 | A | 12/2006 |
| JP | S53-141187 | A | 12/1978 |
| JP | S58-006988 | A | 1/1983 |
| JP | S62-226580 | A | 10/1987 |
| JP | H05-242905 | A | 9/1993 |
| JP | H05-275108 | A | 10/1993 |
| JP | H06-188005 | A | 7/1994 |
| JP | H06-260183 | A | 9/1994 |
| JP | H06-105615 | B | 12/1994 |
| JP | H09-92321 | A | 4/1997 |
| JP | H9-223513 | A | 6/1997 |
| JP | EP 0790658 | A2 * | 8/1997 .......... H01M 2/1653 |
| JP | H10-208767 | A | 8/1998 |
| JP | H11-260390 | A | 9/1999 |
| JP | 2000-235849 | A | 8/2000 |
| JP | 2001-093560 | A | 4/2001 |
| JP | 2001-167786 | A | 6/2001 |
| JP | 2001-243964 | A | 9/2001 |
| JP | 2004-273255 | A | 9/2004 |
| JP | 2005-060516 | A | 3/2005 |
| JP | 2005-158383 | A | 6/2005 |
| JP | 2005-294171 | A | 10/2005 |
| JP | 2005-342718 | A | 12/2005 |
| JP | 2006-059560 | A | 3/2006 |
| JP | 2008-544444 | A | 12/2008 |
| JP | 2009-057567 | A | 3/2009 |
| JP | 2010-086935 | A | 4/2010 |
| JP | 2011-054315 | A | 3/2011 |
| JP | 2014-516062 | A | 7/2014 |
| WO | 2002-0026883 | A | 4/2002 |
| WO | 2005-0103161 | A1 | 11/2005 |
| WO | 2005-103161 | A1 | 11/2005 |
| WO | 2006-046620 | A | 5/2006 |
| WO | 2010-101195 | A1 | 9/2010 |
| WO | 2010-143634 | A1 | 12/2010 |
| WO | 2011-034179 | A1 | 3/2011 |
| WO | 2011-104542 | A1 | 9/2011 |
| WO | 2011-111717 | A1 | 9/2011 |
| WO | 2012-174463 | A1 | 12/2012 |

OTHER PUBLICATIONS

International Search Report issued with respect to application No. PCT/JP2012/083944, dated Feb. 12, 2013.
International preliminary report on patentability issued with respect to application No. PCT/JP2012/083944, dated Feb. 12, 2013.
International search report issued with respect to application No. PCT/JP2012/083950, dated Apr. 2, 2013.
International preliminary report on patentability issued with respect to application No. PCT/JP2012/083950, dated Apr. 2, 2013.
International search report issued with respect to application No. PCT/JP2012/083961 dated Feb. 12, 2013.
International preliminary report on patentability issued with respect to application No. PCT/JP2012/083961, dated Feb. 12, 2013.
International search report issued with respect to application No. PCT/JP2012/083953 dated Apr. 9, 2013.
International preliminary report on patentability issued with respect to application No. PCT/JP2012/083953, dated Apr. 9, 2013.
European Search Report issued with respect to application No. 12863942.4, dated Jul. 16, 2015.
European Search Report issued with respect to application No. EP16159747.1, dated Jun. 8, 2016.
Yoshitake M et al., "Perfluorinated Ionic Polymers for PEFCs (Including Supported PFSA)," Advances in Polymer Science, vol. 215, Aug. 2, 2008, pp. 127-155.

* cited by examiner

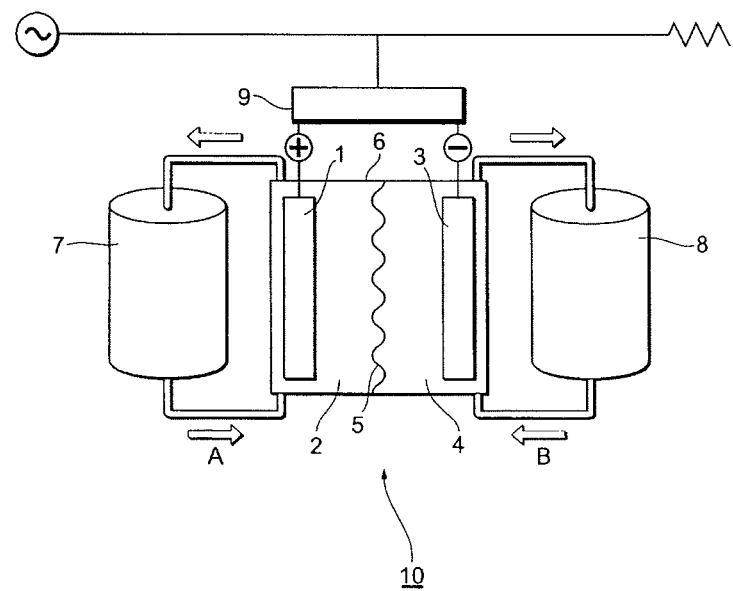

REDOX FLOW SECONDARY BATTERY AND ELECTROLYTE MEMBRANE FOR REDOX FLOW SECONDARY BATTERY

TECHNICAL FIELD

The present invention relates to a redox flow secondary battery, and an electrolyte membrane for a redox flow secondary battery.

BACKGROUND ART

Redox flow secondary batteries are to store and discharge electricity, and belong to large-size stationary batteries used for leveling the amounts of electricity used.

The redox flow secondary battery is configured such that a positive electrode and an electrolyte solution comprising a positive electrode active substance (positive electrode cell) and a negative electrode and a negative electrode electrolyte solution comprising a negative electrode active substance (negative electrode cell) are separated by a diaphragm; charge and discharge are carried out by utilizing the oxidation and reduction reactions of both the active substances; and the electrolyte solutions including both the active substances are circulated from storage tanks to an electrolytic bath, and a current is taken out and utilized.

As an active substance contained in an electrolyte solution, there are used, for example, iron-chromium-based ones, chromium-bromine-based ones, zinc-bromine-based ones, and vanadium-based ones utilizing the difference in electric charge.

Particularly, vanadium-type secondary batteries, since having advantages of a high electromotive force, a high electrode reaction rate of vanadium ions, only a small amount of hydrogen generated as a side-reaction, a high output, and the like, are being developed earnestly.

For diaphragms, devices are made so that electrolyte solutions comprising active substances of both electrodes are not mixed. However, conventional diaphragms are liable to be oxidized and for example a problem thereof is that the electric resistance needs to be made sufficiently low.

Although in order to raise the current efficiency of batteries, the permeation of each active substance ion contained in the cell electrolyte solutions of both the electrodes (contamination with electrolytes in electrolyte solutions of both electrodes) is demanded to be prevented as much as possible, an ion-exchange membrane excellent in the ion perm-selectivity, in which protons ($H^+$) carrying the charge easily sufficiently permeate, is demanded.

The vanadium-type secondary battery utilizes an oxidation and reduction reaction of divalent vanadium ($V^{2+}$)/ trivalent vanadium ($V^{3+}$) in a negative electrode cell, and oxidation and reduction reaction of tetravalent vanadium ($V^{4+}$)/pentavalent vanadium ($V^{5+}$) in a positive electrode cell. Therefore, since electrolyte solutions of the positive electrode cell and the negative electrode cell have ion species of the same metal, even if the electrolyte solutions are permeated through a diaphragm and mixed, the ion species are normally reproduced by charging; therefore, there hardly arises a large problem as compared with other metal species. However, since active substances becoming useless increase and the current efficiency decreases, it is preferable that active substance ions permeate freely as little as possible through the diaphragm.

There are conventionally batteries utilizing various types of diaphragms (in the present description, referred to as "electrolyte membrane" or simply "membrane" in some cases); and for example, batteries are reported which use porous membranes allowing free permeation by an ionic differential pressure and an osmotic pressure of electrolyte solutions as the driving force. For example, Patent Literature 1 discloses a polytetrafluoroethylene (hereinafter, also referred to as "PTFE") porous membrane, a polyolefin (hereinafter, also referred to as "PO")-based porous membrane, a PO-based nonwoven fabric, and the like as a diaphragm for a redox battery.

Patent Literature 2 discloses a composite membrane in combination of a porous membrane and a hydrous polymer for the purpose of the improvement of the charge and discharge energy efficiency of a redox flow secondary battery and the improvement of the mechanical strength of a diaphragm thereof.

Patent Literature 3 discloses a technology in which a membrane of a cellulose or an ethylene-vinyl alcohol copolymer is utilized as a nonporous hydrophilic polymer membrane excellent in the ion permeability and having a hydrophilic hydroxyl group for the purpose of the improvement of the charge and discharge energy efficiency of a redox flow secondary battery.

Patent Literature 4 states that the utilization of a polysulfone-based membrane (anion-exchange membrane) as a hydrocarbon-based ion-exchange resin makes the current efficiency of a vanadium redox secondary battery 80% to 88.5% and the radical oxidation resistance excellent.

Patent Literature 5 discloses a method of raising the reaction efficiency by making expensive platinum to be carried on a porous carbon of a positive electrode in order to raise the current efficiency of a redox flow secondary battery, and describes a Nafion (registered trademark) N117 made by Du Pont K.K. and a polysulfone-based ion-exchange membrane as a diaphragm in Examples.

Patent Literature 6 discloses an iron-chromium-type redox flow battery in which a hydrophilic resin is coated on pores of a porous membrane of a polypropylene (hereinafter, also referred to as "PP") or the like. An Example of Patent Literature 6 discloses a membrane covered in a thickness of several micrometers with a fluorine-based ion-exchange resin (made by Du Pont K.K., registered trademark: "Nafion") on both surfaces of a PP porous membrane of 100 μm in thickness. Here, Nafion is a copolymer comprising a repeating unit represented by —($CF_2$—$CF_2$)— and a repeating unit represented by —($CF_2$—CF(—O—($CF_2$CFXO)$_n$—($CF_2$)$_m$—$SO_3H$))— wherein X=$CF_3$, n=1, and m=2.

Patent Literature 7 discloses an example of a vanadium-type redox flow secondary battery decreased in the cell electric resistance as much as possible and raised in the efficiency by the improvement of the electrodes including the usage of a two-layer liquid-permeable porous carbon electrode having a specific surface grating.

Patent Literature 8 discloses an example of a vanadium-type redox flow battery using an anion-exchange type diaphragm having a low membrane resistance, being excellent in the proton permeability and the like, and being composed of a crosslinked polymer having a pyridinium group and utilizing $N^+$ as a cation. The crosslinked polymer disclosed is a polymer obtained by copolymerizing a pyridinium group-comprising vinyl polymerizable monomer, a styrene-based monomer and the like, and a crosslinking agent such as divinylbenzene.

Patent Literature 9, for the purpose of reducing the cell resistance and improving the power efficiency and the like, discloses a redox flow secondary battery utilizing a membrane as a diaphragm, the membrane having a structure in which a cation-exchange membrane (a fluorine-based polymer or another hydrocarbon-based polymer) and an anion-exchange membrane (a polysulfone-based polymer or the like) are alternately laminated, and having a cation-exchange membrane disposed on the side of the membrane contacting with a positive electrode electrolyte solution.

Patent Literature 10 discloses a secondary battery using as a diaphragm a membrane excellent in the chemical resistance, low in the electric resistance, and excellent in the ion permselectivity, which is an anion-exchange membrane made by compositing a porous base material composed of a porous PTFE-based resin with a crosslinked polymer having a repeating unit of a vinyl heterocyclic compound having two or more hydrophilic groups (vinylpyrrolidone having an amino group, or the like).

The principle described therein is that although metal cations, having a large ion diameter and a much amount of electric charge, receive an electric repulsion by cations of a diaphragm surface layer part and are inhibited from the membrane permeation under the potential difference application, protons ($H^-$), having a small ion diameter and being monovalent can easily diffuse and permeate in the diaphragm having cations to thereby give a low electric resistance.

Patent Literature 11 discloses examples using Nafion (registered trademark of Du Pont K.K.) and Gore Select (registered trademark of W. L. Gore & Associates, Inc.).

CITATION LIST

Patent Literature

Patent Literature 1: Japanese Patent Laid-Open No. 2005-158383
Patent Literature 2: Japanese Patent Publication No. H6-105615
Patent Literature 3: Japanese Patent Laid-Open No. S62-226580
Patent Literature 4: Japanese Patent Laid-Open No. H6-188005
Patent Literature 5: Japanese Patent Laid-Open No. H5-242905
Patent Literature 6: Japanese Patent Laid-Open No. H6-260183
Patent Literature 7: Japanese Patent Laid-Open No. H9-92321
Patent Literature 8: Japanese Patent Laid-Open No. H10-208767
Patent Literature 9: Japanese Patent Laid-Open No. H11-260390
Patent Literature 10: Japanese Patent Laid-Open No. 2000-235849
Patent Literature 11: National Publication of International Patent Application No. 2008-544444

SUMMARY OF INVENTION

Technical Problem

However, only simply making the diaphragm thin as described in Patent Literature 1 is insufficient for the improvement of the ion permselectivity, the decrease of the electric resistance originated from the diaphragm, and the improvement of the current efficiency.

The composite membrane disclosed in Patent Literature 2 has a high electric resistance, and a problem thereof is that each ion freely diffuses though not so easily as in porous membranes to thereby give a poor battery current efficiency.

The membrane disclosed in Patent Literature 3 also has the similar problem as in the above, and is inferior also in the oxidation-resistant durability.

The battery disclosed in Patent Literature 4 is yet insufficient in the current efficiency, inferior also in the oxidative deterioration resistance in a sulfuric acid electrolyte solution over a long period, and insufficient also in the durability. The Patent Literature, although disclosing a battery using a PTFE-based ion-exchange membrane as a comparative example, also states that the current efficiency is 64.8 to 78.6% and insufficient.

Also the battery disclosed in Patent Literature 5 cannot solve the similar problem as in the above, and a problem thereof is that a large-size facility is resultantly high in price.

A problem of the membrane disclosed in Patent Literature 6 is that the internal resistance increases unless the thickness of a coated membrane is made extremely thin (several micrometers). No devices to improve the ion permselectivity are described at all.

The battery disclosed in Patent Literature 7, since using a polysulfone-based diaphragm, is not sufficient in the ion permselectivity and the oxidative deterioration resistance of the diaphragm, and is not sufficient in the electric resistance, the current efficiency, and the durability of the battery.

The battery disclosed in Patent Literature 8 is insufficient in the current efficiency, and has a problem of the degradation of properties because of the oxidative deterioration if the battery is used for a long period.

A problem of the membrane disclosed in Patent Literature 9 is that the electric resistance becomes high by the long-period usage.

In the battery disclosed in Patent Literature 10, the internal resistance (electric resistance) of the membrane cannot be said to be sufficiently low, and there arises a problem of the oxidative deterioration by the long-period usage.

In the battery disclosed in Patent Literature 11, there is still room for improvement from the viewpoint of securely preventing the diaphragm permeation of active substance ions, and improving the current efficiency.

Electrolyte membranes (diaphragms) for conventional vanadium-type redox flow batteries are used for the purpose of suppressing the diffusion, migration, and permeation of active substance ions to counter electrodes (cells), and allowing protons ($H^+$) to selectively permeate along with the operation of charge and discharge as the purpose, in each of a cell (negative electrode side) in which ions of a low-valent group of vanadium ions, which are active substances of electrolyte solutions of both electrodes, hold a large majority, and a cell (positive electrode side) in which ions of a high-valent group of the vanadium ions hold a large majority. However, the performance cannot be said to be sufficient at present.

As a membrane base material composed mainly of a hydrocarbon-based resin, there are used a porous membrane which only simply separates electrolyte solutions comprising electrolytes as principal parts of both cells and exhibits no ion permselectivity, a (nonporous) hydrophilic membrane base material exhibiting no ion permselectivity, a porous membrane having a hydrophilic membrane base material embedded therein or covered thereon, and the like. There are also used as a diaphragm a so-called cation-exchange membrane in which the membrane itself has various types of anion groups, or a composite membrane in which a cation-exchange resin is covered on or embedded in pores of a porous membrane base material, an anion-exchange membrane in which the membrane itself similarly has cation groups, or a composite membrane in which an anion-exchange resin is similarly covered on or embedded in a porous membrane base material, a membrane of a laminate type of the cation-exchange membrane and anion-exchange membrane, and the like; and studies making the most of respective features are being carried out.

No ion-exchange resin diaphragm as the diaphragm has been developed so far which sufficiently satisfies two contrary performances of the electric resistance (depending mainly on the proton permeability) and the permeability inhibition of metal ions (polyvalent cations), which are active substances as the principal parts, and further no ion-exchange resin diaphragm has been developed so far which satisfies, in addition to the above two properties, the oxidative deterioration resistance (hydroxy radical resistance) over a long period. Also for fluorine-based ion-exchange resins, no sufficient studies of devices have been made on mutually contradictory properties of the excellent proton ($H^+$) permeability and the inhibition of the active substance ion permeation; and no redox flow battery and no electrolyte membrane therefor have been developed which sufficiently satisfy a low electric resistance, a high current efficiency, the oxidative deterioration resistance (hydroxy radical resistance), and the like.

In consideration of the above-mentioned situation, it is an object of the present invention to provide: an electrolyte membrane for a redox flow secondary battery, the electrolyte membrane having the excellent ion permselectivity capable of suppressing the ion permselectivity of active substance without impairing the proton ($H^+$) permeability, having a low electric resistance, being capable of achieving a high current efficiency, and also having the oxidative deterioration resistance (hydroxy radical resistance); and a redox flow secondary battery using the electrolyte membrane.

Solution to Problem

As a result of exhaustive studies to solve the above-mentioned problems, the present inventors have found that the use of an electrolyte membrane comprising a polyelectrolyte polymer and further having a predetermined reinforcing material can achieve the excellent ion permselectivity, the low electric resistance, the high current efficiency, and the oxidative deterioration resistance (hydroxy radical resistance), and these findings have led to the completion of the present invention.

That is, the present invention is as follows.

[1]

A redox flow secondary battery comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a diaphragm to separate the positive electrode cell chamber and the negative electrode cell chamber, wherein the positive electrode cell chamber comprises a positive electrode electrolyte solution comprising an active substance; and the negative electrode cell chamber comprises a negative electrode electrolyte solution comprising an active substance;

wherein the redox flow secondary battery charges and discharges based on changes in valences of the active substances in the electrolyte solutions;

wherein the electrolyte membrane comprises an ion-exchange resin composition comprising a polyelectrolyte polymer as a main component; and wherein the electrolyte membrane has a reinforcing material composed of a fluorine-based microporous membrane.

[2]

A redox flow secondary battery comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a diaphragm to separate the positive electrode cell chamber and the negative electrode cell chamber, wherein the positive electrode cell chamber comprises a positive electrode electrolyte solution comprising an active substance; and the negative electrode cell chamber comprises a negative electrode electrolyte solution comprising an active substance;

wherein the redox flow secondary battery charges and discharges based on changes in valences of the active substance in the electrolyte solutions;

wherein the electrolyte membrane comprises an ion-exchange resin composition comprising a polyelectrolyte polymer as a main component; and wherein the electrolyte membrane has a reinforcing material composed of a nonwoven fabric and/or a hydrocarbon-based microporous membrane.

[3]

A redox flow secondary battery comprising an electrolytic bath comprising:

a positive electrode cell chamber comprising a positive electrode composed of a carbon electrode;

a negative electrode cell chamber comprising a negative electrode composed of a carbon electrode; and an electrolyte membrane as a diaphragm to separate the positive electrode cell chamber and the negative electrode cell chamber, wherein the positive electrode cell chamber comprises a positive electrode electrolyte solution comprising an active substance; and the negative electrode cell chamber comprises a negative electrode electrolyte solution comprising an active substance;

wherein the redox flow secondary battery charges and discharges based on changes in valences of the active substance in the electrolyte solutions;

wherein the electrolyte membrane comprises an ion-exchange resin composition comprising a polyelectrolyte polymer as a main component; and wherein the electrolyte membrane has a reinforcing material composed of a woven fabric.

[4]

The redox flow secondary battery according to any one of the above [1] to [3], wherein the reinforcing material has a structure in which the reinforcing material is impregnated with the polyelectrolyte polymer, and an internal volume of the reinforcing material is substantially occluded.

[5]

The redox flow secondary battery according to any one of the above [1] to [4], wherein the redox flow secondary battery is a vanadium-type redox flow secondary battery using sulfuric acid electrolyte solutions comprising vanadium as the positive electrode electrolyte solution and the negative electrode electrolyte solution.

[6]
The redox flow secondary battery according to any one of the above [1] to [5], wherein the electrolyte membrane comprises, as the polyelectrolyte polymer, the ion-exchange resin composition comprising as the main component a fluorine-based polyelectrolyte polymer having a structure represented by the following formula (1):

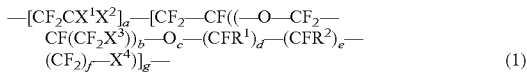

$$-[CF_2CX^1X^2]_a-[CF_2-CF((-O-CF_2-CF(CF_2X^3))_b-O_c-(CFR^1)_d-(CFR^2)_e-(CF_2)_f-X^4)]_g- \quad (1)$$

wherein $X^1$, $X^2$, and $X^3$ each independently represent one or more selected from the group consisting of halogen atoms and perfluoroalkyl groups having 1 to 3 carbon atoms; $X^4$ represents $COOZ$, $SO_3Z$, $PO_3Z_2$, or $PO_3HZ$ wherein Z represents a hydrogen atom, an alkali metal atom, an alkaline earth metal atom, or amines ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \leq a < 1$, $0 < g \leq 1$, and $a+g=1$, b represents an integer of 0 to 8, c represents 0 or 1, and d, e, and f each independently represent an integer of 0 to 6 (with the proviso that d, e, and f are not 0 at the same time).

[7]
The redox flow secondary battery according to any one of the above [1] to [6], wherein the electrolyte membrane comprises, as the polyelectrolyte polymer, the ion-exchange resin composition comprising as the main component a perfluorocarbonsulfonic acid resin (PFSA) being a fluorine-based polyelectrolyte polymer having a structure represented by the following formula (2):

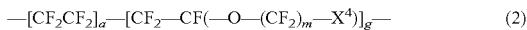

$$-[CF_2CF_2]_a-[CF_2-CF(-O-(CF_2)_m-X^4)]_g- \quad (2)$$

wherein a and g represent numbers satisfying $0 \leq a < 1$, $0 < g \leq 1$, and $a+g=1$; m represents an integer of 1 to 6; and $X^4$ represents $SO_3H$.

[8]
The redox flow secondary battery according to any one of above [1] to [7], wherein the polyelectrolyte polymer has an equivalent weight EW (dry mass in grams per equivalent of ion-exchange groups) of 300 to 1,300 g/eq; and the electrolyte membrane has an equilibrium moisture content of 5 to 80% by mass.

[9]
The redox flow secondary battery according to any one of above [1] to [8], wherein the ion-exchange resin composition comprises 0.1 to 20 parts by mass of polyphenylene ether resin and/or a polyphenylene sulfide resin with respect to 100 parts by mass of the polyelectrolyte polymer.

[10]
An electrolyte membrane for a redox flow secondary battery, comprising an ion-exchange resin composition comprising a polyelectrolyte polymer as a main component, and having a fluorine-based microporous membrane as a reinforcing material.

[11]
An electrolyte membrane for a redox flow secondary battery, comprising an ion-exchange resin composition comprising a polyelectrolyte polymer as a main component, and having a reinforcing material composed of a nonwoven fabric and/or a hydrocarbon-based microporous membrane.

[12]
An electrolyte membrane for a redox flow secondary battery, comprising an ion-exchange resin composition comprising a polyelectrolyte polymer as a main component, and having a reinforcing material composed of a woven fabric.

[13]
The electrolyte membrane for the redox flow secondary battery according to any one of the above [10] to [12], wherein the reinforcing material has a structure in which the reinforcing material is impregnated with the polyelectrolyte polymer, and an internal volume of the reinforcing material for the redox flow secondary battery is substantially occluded.

[14]
The electrolyte membrane for the redox flow secondary battery according to any one of the above [10] to [13], comprising, as the polyelectrolyte polymer, an ion-exchange resin composition comprising as a main component a fluorine-based polyelectrolyte polymer having a structure represented by the following formula (1):

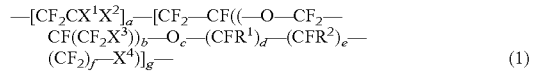

$$-[CF_2CX^1X^2]_a-[CF_2-CF((-O-CF_2-CF(CF_2X^3))_b-O_c-(CFR^1)_d-(CFR^2)_e-(CF_2)_f-X^4)]_g- \quad (1)$$

wherein $X^1$, $X^2$, and $X^3$ each independently represent one or more selected from the group consisting of halogen atoms and perfluoroalkyl groups having 1 to 3 carbon atoms; $X^4$ represents $COOZ$, $SO_3Z$, $PO_3Z_2$, or $PO_3HZ$ wherein Z represents a hydrogen atom, an alkali metal atom, an alkaline earth metal atom, or amines ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; $R^1$ and $R^2$ each independently represent one or more selected from the group consisting of halogen atoms and perfluoroalkyl groups and fluorochloroalkyl groups having 1 to 10 carbon atoms; and a and g represent numbers satisfying $0 \leq a < 1$, $0 < g \leq 1$, and $a+g=1$, b represents an integer of 0 to 8, c represents 0 or 1, and d, e, and f each independently represent an integer of 0 to 6 (with the proviso that d, e, and f are not 0 at the same time).

[15]
The electrolyte membrane for the redox flow secondary battery according to any one of the above [10] to [14], wherein the polyelectrolyte polymer is a perfluorocarbonsulfonic acid resin (PFSA) being a fluorine-based polyelectrolyte polymer having a structure represented by the following formula (2):

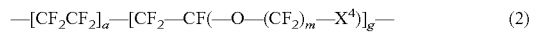

$$-[CF_2CF_2]_a-[CF_2-CF(-O-(CF_2)_m-X^4)]_g- \quad (2)$$

wherein a and g represent numbers satisfying $0 \leq a < 1$, $0 < g \leq 1$, and $a+g=1$; m represents an integer of 1 to 6; and $X^4$ represents $SO_3H$.

[16]
The electrolyte membrane for the redox flow secondary battery according to any one of above [10] to [15], wherein the polyelectrolyte polymer has an equivalent weight EW (dry mass in grams per equivalent of ion-exchange groups) of 300 to 1,300 g/eq; and the electrolyte membrane has an equilibrium moisture content of 5 to 80% by mass.

[17]
The electrolyte membrane for the redox flow secondary battery according to any one of the above [10] to [16], wherein the ion-exchange resin composition comprises 0.1 to 20 parts by mass of a polyphenylene ether resin and/or a polyphenylene sulfide resin with respect to 100 parts by mass of the polyelectrolyte polymer.

[18]
The electrolyte membrane for the redox flow secondary battery according to any one of above [10] to [17], wherein the electrolyte membrane for the redox flow secondary battery is subjected to a heat treatment at 130 to 200° C. for 1 to 60 min.

Advantageous Effects of Invention

The electrolyte membrane for a redox flow secondary battery according to the present invention has the excellent ion permselectivity. Therefore, the electrolyte membrane has a high proton (hydrogen ion) permeability and a low electric resistance, and can suppress the permeation of active substance ions in the electrolyte solutions. Further since the electrolyte membrane exhibits a high current efficiency, and exhibits a high oxidative deterioration prevention effect to hydroxy radicals generated in the electrolyte solution cells in a system over a long period, the elimination of ion groups, the collapse phenomenon of the polyelectrolyte, and the like, which are caused when a usual hydrocarbon-based electrolyte is utilized, can be suppressed.

BRIEF DESCRIPTION OF DRAWING

FIG. 1 shows an example of a schematic diagram of a redox flow secondary battery in the present embodiments.

DESCRIPTION OF EMBODIMENTS

Hereinafter, embodiments to carry out the present invention (hereinafter, referred to as "present embodiments") will be described in detail. The present invention is not limited to the following present embodiments.
[Redox Flow Secondary Battery]
A redox flow secondary battery according to the present embodiment, comprising an electrolytic bath comprising:
a positive electrode cell chamber comprising a positive electrode composed of a carbon electrode;
a negative electrode cell chamber comprising a negative electrode composed of a carbon electrode; and
an electrolyte membrane as a diaphragm to separate the positive electrode cell chamber and the negative electrode cell chamber,
wherein the positive electrode cell chamber comprises a positive electrode electrolyte solution comprising an active substance; and the negative electrode cell chamber comprises a negative electrode electrolyte solution comprising an active substance;
wherein the redox flow secondary battery charges and discharges based on changes in valences of the active substance in the electrolyte solutions;
wherein the electrolyte membrane comprises an ion-exchange resin composition comprising a polyelectrolyte polymer as a main component; and
wherein the electrolyte membrane has a predetermined reinforcing material.
FIG. 1 shows an example of a schematic diagram of a redox flow secondary battery according to the present embodiment.
A redox flow secondary battery 10 in the present embodiment has an electrolytic bath 6 which comprises a positive electrode cell chamber 2 comprising a positive electrode 1 composed of a carbon electrode, a negative electrode cell chamber 4 comprising a negative electrode 3 composed of a carbon electrode, and an electrolyte membrane 5 as a diaphragm to separate the positive electrode cell chamber 2 and the negative electrode cell chamber 4.

The positive electrode cell chamber 2 comprises a positive electrode electrolyte solution comprising a positive electrode active substance; and the negative electrode cell chamber 4 comprises a negative electrode electrolyte solution comprising a negative electrode active substance, respectively.

The positive electrode electrolyte solution and the negative electrode electrolyte solution comprising the active substances are, for example, stored in a positive electrode electrolyte solution tank 7 and a negative electrode electrolyte solution tank 8, and fed to respective cell chambers by pumps or the like (arrows A and B).

The current generated by the redox flow secondary battery may be converted from direct current to alternating current through an AC/DC converter 9.

A redox flow secondary battery according to the present embodiment has a structure in which each of liquid-permeable porous current collector electrodes (for a negative electrode and for a positive electrode) is disposed on either side of a diaphragm; the electrode for the negative electrode, the electrode for the positive electrode, and the diaphragm are held by pressing; one side partitioned by the diaphragm is made a positive electrode cell chamber, and the other side is made a negative electrode cell chamber; and the thicknesses of both the cell chambers are secured by spacers.

In the case where the redox flow secondary battery according to the present embodiment is a vanadium-type redox flow secondary battery, the charge and discharge of the battery is carried out by circulating a positive electrode electrolyte solution composed of a sulfuric acid electrolyte solution comprising tetravalent vanadium ($V^{4+}$) and pentavalent vanadium ($V^{5+}$) to the positive electrode cell chamber, and circulating a negative electrode electrolyte solution comprising trivalent vanadium ($V^{3+}$) and divalent vanadium ($V^{2+}$) to the negative electrode cell chamber.

In the charge time therein, in the positive electrode cell chamber, vanadium ions release electrons to thereby oxidize $V^{4+}$ to $V^{5+}$; and in the negative electrode cell chamber, electrons having returned through an external circuit reduce $V^{3+}$ to $V^{2+}$.

In the oxidation and reduction reactions, in the positive electrode cell chamber, protons ($H^+$) become excessive; by contrast, in the negative electrode cell chamber, protons ($H^+$) become insufficient.

The excessive protons in the positive electrode cell chamber selectively migrate to the negative electrode chamber through the diaphragm to thereby hold the electric neutrality. In the discharge time, a reaction reverse thereto progresses.

The battery efficiency (%) at this time is represented by a ratio (%) obtained by dividing a discharge electric energy by a charge electric energy; and both the electric energies depend on the internal resistance of the battery cells, the ion selectivity of the diaphragm, and the current losses of others.

Since the reduction of the internal resistance of the battery cells improves the voltage efficiency, and the improvement of the ion permselectivity of the diaphragm and the reduction of the current losses of others improve the current efficiency, these factors become important indices in the redox flow secondary battery.
(Electrolyte Membrane)
In a first form of an electrolyte membrane for a redox flow secondary battery in the present embodiment, the electrolyte membrane has a reinforcing material composed of a fluorine-based microporous membrane.

In a second form of an electrolyte membrane for a redox flow secondary battery in the present embodiment, the electrolyte membrane has a reinforcing material composed of a nonwoven fabric and/or a hydrocarbon-based microporous membrane.

In a third form of an electrolyte membrane for a redox flow secondary battery in the present embodiment, the electrolyte membrane has a reinforcing material composed of a woven fabric.

These reinforcing materials will be described later.

"Comprising as a main component" in the present description refers to that the component is contained in an ion-exchange resin composition preferably in about 33.3 to 100% by mass, more preferably in 40 to 100% by mass, and still more preferably in 50 to 99.5% by mass.

<Ion-Exchange Resin Composition>

The electrolyte membrane constituting a redox flow secondary battery according to the present embodiment comprises an ion-exchange resin composition comprising a polyelectrolyte polymer as a main component.

The polyelectrolyte polymer preferably includes a fluorine-based polyelectrolyte polymer and a hydrocarbon-based polyelectrolyte polymer described later.

The fluorine-based polyelectrolyte polymer preferably has a structure represented by the following formula (1).

The fluorine-based polyelectrolyte polymer is not especially limited and may contain other structures as long as having a structure represented by the following formula (1):

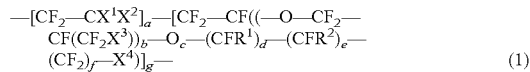

$$-[CF_2-CX^1X^2]_a-[CF_2-CF((-O-CF_2-CF(CF_2X^3))_b-O_c-(CFR^1)_d-(CFR^2)_e-(CF_2)_f-X^4)]_g- \quad (1)$$

wherein $X^1$, $X^2$, and $X^3$ each independently represent one or more selected from the group consisting of halogen atoms and perfluoroalkyl groups having 1 to 3 carbon atoms; $X^4$ represents COOZ, $SO_3Z$, $PO_3Z_2$, or $PO_3HZ$ wherein Z represents a hydrogen atom, an alkali metal atom, an alkaline earth metal atom, or amines ($NH_4$, $NH_3R_1$, $NH_2R_1R_2$, $NHR_1R_2R_3$, $NR_1R_2R_3R_4$) wherein $R_1$, $R_2$, $R_3$, and $R_4$ each independently represent one or more selected from the group consisting of alkyl groups and arene groups, when $X^4$ is $PO_3Z_2$, Z may be identical or different; and $R^1$ and $R^2$ each independently represent one or more selected from the group consisting of halogen atoms and perfluoroalkyl groups and fluorochloroalkyl groups having 1 to 10 carbon atoms.

a and g represent numbers satisfying $0 \le a < 1$, $0 < g \le 1$, and $a+g=1$, b represents an integer of 0 to 8, c represents 0 or 1, and d, e, and f each independently represent an integer of 0 to 6 (with the proviso that d, e, and f are not 0 at the same time).

As described above, in the formula (1), $X^1$, $X^2$ and $X^3$ each independently represent one or more selected from the group consisting of halogen atoms and perfluoroalkyl groups having 1 to 3 carbon atoms. Here, the halogen atoms include a fluorine atom, a chlorine atom, a bromine atom, and an iodine atom. $X^1$, $X^2$, and $X^3$, from the viewpoint of the chemical stability including the oxidative deterioration resistance of the polymer, are preferably each a fluorine atom or a perfluoroalkyl group having 1 to 3 carbon atoms.

As described above, in the formula (1), $X^4$ represents COOZ, $SO_3Z$, $PO_3Z_2$, or $PO_3HZ$. Hereinafter, $X^4$ is also referred to as an "ion-exchange group."

Z represents a hydrogen atom, an alkali metal atom, an alkaline earth metal atom, or amines ($NH_4$, $NH_3R_1$, $NH_2R_1R_2$, $NHR_1R_2R_3$, $NR_1R_2R_3R_4$). Here, the alkali metal atom is not especially limited, and includes a lithium atom, a sodium atom, and a potassium atom. The alkaline earth metal atom is not especially limited, and includes a calcium atom and a magnesium atom.

$R_1$, $R_2$, $R_3$, and $R_4$ each independently represent one or more selected from the group consisting of alkyl groups and arene groups. Here, in the case where $X^4$ is $PO_3Z_2$, Z may be identical or different. $X^4$, from the viewpoint of the chemical stability of the polymer, is preferably $SO_3Z$.

$R^1$ and $R^2$ each independently represent one or more selected from the group consisting of halogen atoms and perfluoroalkyl groups and fluorochloroalkyl groups having 1 to 10 carbon atoms. Here, the halogen atoms include a fluorine atom, a chlorine atom, a bromine atom, and an iodine atom.

As described above, a and g represent numbers satisfying $0 \le a < 1$, $0 < g \le 1$, and $a+g=1$. b represents an integer of 0 to 8. c represents 0 or 1. d, e, and f each independently represent an integer of 0 to 6. Here, d, e, and f are not 0 at the same time.

The use of a fluorine-based polyelectrolyte polymer as a polyelectrolyte polymer contained in an electrolyte membrane of a redox polymer secondary battery according to the present invention is likely to exhibit the advantage of the present invention more remarkably. The fluorine-based polyelectrolyte polymer is preferably a perfluorocarbonsulfonic acid resin (hereinafter, also referred to as "PFSA resin"). The PFSA resin is a resin in which perfluorocarbons as side chains are bonded to the main chain composed of a PTFE skeleton chain, and one or two or more sulfonic acid groups (as the case may be, a part of the groups may be a form of a salt) are bonded to the each side chain.

The PFSA resin preferably comprises a repeating unit represented by $-(CF_2-CF_2)-$ and a repeating unit derived from a compound represented by the following formula (3) or (4), and is further preferably composed of a repeating unit represented by $-(CF_2-CF_2)-$ and a repeating unit derived from a compound represented by the formula (3) or (4).

$$CF_2=CF(-O-(CF_2CFXO)_n\text{-}[A]) \quad \text{Formula (3):}$$

wherein X represents F or a perfluoroalkyl group having 1 to 3 carbon atoms; n represents an integer of 0 to 5; and [A] is $(CF_2)_m-SO_3H$ wherein m represents an integer of 1 to 6, here, n and m are not 0 at the same time,

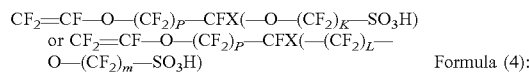

$$CF_2=CF-O-(CF_2)_P-CFX(-O-(CF_2)_K-SO_3H)$$
$$\text{or } CF_2=CF-O-(CF_2)_P-CFX(-(CF_2)_L-O-(CF_2)_m-SO_3H) \quad \text{Formula (4):}$$

wherein X represents a perfluoroalkyl group having 1 to 3 carbon atoms; and P represents an integer of 0 to 12, K represents an integer of 1 to 5, L represents an integer of 1 to 5, and m represents an integer of 0 to 6, here, K and L may be identical or different, and P, K, and L are not 0 at the same time.

The PFSA resin is a copolymer comprising a repeating unit represented by $-(CF_2-CF_2)-$ and a repeating unit represented by $-(CF_2-CF(-O-(CF_2CFXO)_n-(CF_2)_m-SO_3H)-$ wherein X represents F or $CF_3$; and n represents an integer of 0 to 5, and m represents an integer of 0 to 12, here, n and m are not 0 at the same time, and is more preferably a copolymer necessarily comprising a repeating unit represented by $-(CF_2-CF(-O-(CF_2CFXO)_n-(CF_2)_m-SO_3H))-$ wherein X represents $CF_3$; and n represents 0 or 1, and m represents an integer of 0 to 12, here, n and m are not 0 at the same time. The case where the PFSA resin is a copolymer having the above structure and has a predetermined equivalent weight EW has such tendencies that an obtained electrolyte membrane exhibits sufficient hydrophilicity, and the resistance to radical species generated by oxidative deterioration becomes high.

The case where the PFSA resin comprises the repeating unit of —(CF$_2$—CF(—O—(CF$_2$CFXO)$_n$—(CF$_2$)$_m$—SO$_3$H))— wherein n is 0 and m is an integer of 1 to 6, or both the repeating units of —CF$_2$—CF(—O—(CF$_2$)$_P$—CFX(—O—(CF$_2$)$_K$—SO$_3$H)— and —CF$_2$—CF(—O—(CF$_2$)$_P$—CFX(—(CF$_2$)$_L$—O—(CF$_2$)$_m$—SO$_3$H)— represented by the formula (4) has further such tendencies that the equivalent weight EW becomes low and the hydrophilicity of an obtained electrolyte membrane becomes high.

In the copolymer, of Nafion (registered trademark of Du Pont K.K.) which is a fluorine-based resin used in the conventional technology, comprising a repeating unit represented by —(CF$_2$—CF$_2$)— and a repeating unit of —(CF$_2$—CF(—O—(CF$_2$CFXO)$_n$—(CF$_2$)$_m$—SO$_3$H))—, it is known that X=CF$_3$, n=1 and m=2; and the EW described later is 893 to 1,030.

It has been found as a result of studies by the present inventors that in the case where a PFSA resin is used as an electrolyte membrane for a redox flow secondary battery, the PFSA resin comprising the repeating unit represented by —(CF$_2$—CF(—O—(CF$_2$CFXO)$_n$—(CF$_2$)$_m$—SO$_3$H))— wherein n is 0 and m is an integer of 1 to 6, or both the repeating units of —CF$_2$—CF(—O—(CF$_2$)$_P$—CFX(—O—(CF$_2$)$_K$—SO$_3$H)— and —CF$_2$—CF(—O—(CF$_2$)$_P$—CFX(—(CF$_2$)$_L$—O—(CF$_2$)$_m$—SO$_3$H)— represented by the formula (4) has such tendencies that the hydrophilicity and the ion permselectivity are excellent, and the electric resistance of an obtained redox flow secondary battery is low and the current efficiency thereof is improved, as compared with the above Nafion.

The fluorine-based polyelectrolyte polymer represented by the formula (1) is preferably a perfluorocarbonsulfonic acid resin (PFSA resin) having a structure represented by the following formula (2) because of giving a tendency of making the advantage of the present invention more remarkable.

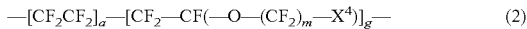

—[CF$_2$CF$_2$]$_a$—[CF$_2$—CF(—O—(CF$_2$)$_m$—X$^4$)]$_g$—  (2)

wherein a and g represent numbers satisfying 0≤a<1, 0<g≤1, and a+g=1; m represents an integer of 1 to 6; and X$^4$ represents SO$_3$H.

The fluorine-based polyelectrolyte polymer represented by the above formula (1) and the PFSA resin having a structure represented by the above formula (2), respectively, are not especially limited as long as having the structures represented by the above formula (1) and the above formula (2), and may comprise other structures.

The fluorine-based polyelectrolyte polymer represented by the above formula (1) and the PFSA resin having a structure represented by the above formula (2) may be those in which a part of ion-exchange groups is subjected to intermolecular direct or indirect partial crosslinking reaction. The partial crosslinking is preferable from the viewpoint of being able to control the solubility and the excessive swell.

For example, even if the EW of a fluorine-based polyelectrolyte polymer is about 280, by carrying out the above partial crosslinking, the solubility of the fluorine-based polyelectrolyte polymer to water can be reduced (the water resistance can be improved).

Also in the case where a fluorine-based polyelectrolyte polymer is in a low melt flow region (polymer region), the above partial crosslinking can increase intermolecular entanglement and reduce the solubility and the excessive swell.

Examples of the partial crosslinking reaction include a reaction of an ion-exchange group with a functional group or the main chain of another molecule, a reaction of ion-exchange groups, and a crosslinking reaction (covalent bond) through an oxidation-resistant low molecular compound, oligomer, polymeric substance, or the like, and as the case may be, a reaction with a substance to form a salt (including an ionic bond with a SO$_3$H group). Examples of the oxidation-resistant low molecular compound, oligomer, and polymeric substance include polyhydric alcohols and organic diamines.

The molecular weight of the fluorine-based polyelectrolyte polymer in the present embodiment is not especially limited, but in terms of a value of a melt flow index (MFI) of the precursor measured according to ASTM: D1238 (measurement conditions: a temperature of 270° C. and a load of 2,160 g), is preferably 0.05 to 50 (g/10 min), more preferably 0.1 to 30 (g/10 min), and still more preferably 0.5 to 20 (g/10 min).

<Equivalent Weight EW of a Fluorine-Based Polyelectrolyte Polymer>

The equivalent weight EW (dry mass in grams of a fluorine-based polyelectrolyte polymer per equivalent weight of an ion-exchange group) of the fluorine-based polyelectrolyte polymer is preferably 300 to 1,300 (g/eq), more preferably 350 to 1,000 (g/eq), still more preferably 400 to 900 (g/eq), and especially preferably 450 to 750 (g/eq).

In a fluorine-based polyelectrolyte polymer having a structure of the above formula (1), by regulating the equivalent weight EW thereof in the above range, an ion-exchange resin composition comprising the polymer can be imparted with excellent hydrophilicity; and an electrolyte membrane obtained by using the resin composition results in having a lower electric resistance and a higher hydrophilicity, and having a large number of smaller clusters (minute moieties where ion-exchange groups coordinate and/or adsorb water molecules), and gives such a tendency that the oxidation resistance (hydroxy radical resistance) and the ion permselectivity are more improved.

The equivalent weight EW of a fluorine-based polyelectrolyte polymer is preferably 300 or higher from the viewpoint of the hydrophilicity and the water resistance of the membrane; and that is preferably 1,300 (g/eq) or lower from the viewpoint of the hydrophilicity and the electric resistance of the membrane.

The equivalent weight EW of a fluorine-based polyelectrolyte polymer can be measured by replacing the fluorine-based polyelectrolyte polymer by a salt, and back-titrating the solution with an alkali solution.

The equivalent weight EW can be regulated by selecting copolymerization ratios of fluorine-based monomers as raw materials of a fluorine-based polyelectrolyte polymer, kinds of the monomers, and the like.

<Method for Producing a Fluorine-Based Polyelectrolyte Polymer>

The fluorine-based polyelectrolyte polymer can be obtained, for example, by producing a precursor of a polyelectrolyte polymer (hereinafter, also referred to as "resin precursor"), and thereafter subjecting the precursor to a hydrolysis treatment.

In the case where the fluorine-based polyelectrolyte polymer is a PFSA resin, the PFSA resin can be obtained, for example, by hydrolyzing a PFSA resin precursor composed of a copolymer of a fluorinated vinyl ether compound represented by the following general formula (5) or (6) with a fluorinated olefin monomer represented by the following general formula (7).

$$CF_2=CF-O-(CF_2CFXO)_n-A \qquad \text{Formula (5):}$$

wherein X represents F or a perfluoroalkyl group having 1 to 3 carbon atoms; n represents an integer of 0 to 5; and A represents $(CF_2)_m-W$, m represents an integer of 0 to 6, n and m are not 0 at the same time, and W represents a functional group capable of being converted to $SO_3H$ by hydrolysis.

$$CF_2=CF-O-(CF_2)_P-CFX(-O-(CF_2)_K-W) \text{ or }$$
$$CF_2=CF-O-(CF_2)_P-CF(-(CF_2)_L-O-$$
$$(CF_2)_m-W) \qquad \text{Formula (6):}$$

wherein X represents a perfluoroalkyl group having 1 to 3 carbon atoms; P represents an integer of 0 to 12; K represents an integer of 1 to 5; L represents an integer of 1 to 5 (with the proviso that L, K, and m are not 0 at the same time); m represents an integer of 0 to 6; and W represents a functional group capable of being converted to $SO_3H$ by hydrolysis.

$$CF_2=CFZ \qquad \text{Formula (7):}$$

wherein Z represents H, Cl, F, a perfluoroalkyl group having 1 to 3 carbon atoms, or a cyclic perfluoroalkyl group which may contain oxygen.

W denoting a functional group capable of being converted to $SO_3H$ by hydrolysis in the above formula (5) is not especially limited, but is $SO_2F$, $SO_2Cl$, or $SO_2Br$. Further in the above formulae, $X=CF_3$, $W=SO_2F$, and $Z=F$ are preferable. Particularly, n=0, m=an integer of 1 to 6, $X=CF_3$, $W=SO_2F$, and $Z=F$ are more preferable because of giving tendencies of providing high hydrophilicity and a solution having a high resin concentration.

The above polyelectrolyte polymer precursor can be synthesized by well-known means.

The resin precursor can be produced, for example, by polymerizing a fluorinated vinyl compound having a group (ion-exchange group precursor group) capable of being converted to an ion-exchange group ($X^4$ in the formula (1)) by hydrolysis or the like in the presence of a radical generator such as a peroxide or the like, with a fluorinated olefin such as tetrafluoroethylene (TFE). The polymerization method is not especially limited, and exemplary methods thereof include a method (solution polymerization) of filling and dissolving and reacting the fluorinated vinyl compound or the like and a gas of the fluorinated olefin in a polymerization solvent such as a fluorine-containing hydrocarbon, to thereby carry out the polymerization, a method (bulk polymerization) of carrying out the polymerization by using the fluorinated vinyl compound itself as a polymerization solvent without using any solvent such as a fluorine-containing hydrocarbon, a method (emulsion polymerization) of filling and reacting the fluorinated vinyl compound and a gas of the fluorinated olefin by using an aqueous solution of a surfactant as a medium, to thereby carry out the polymerization, a method (emulsion polymerization) of filling and emulsifying and reacting the fluorinated vinyl compound and a gas of the fluorinated olefin in an aqueous solution of a surfactant and an emulsifying aid such as an alcohol to thereby carry out the polymerization, and a method (suspension polymerization) of filling and suspending and reacting the fluorinated vinyl compound and a gas of the fluorinated olefin in an aqueous solution of a suspension stabilizer to thereby carry out the polymerization.

As the fluorine-based polyelectrolyte polymer precursor, any produced by any polymerization method described above can be used. The fluorine-based polyelectrolyte polymer precursor may be a block-shape polymer or a taper-shape polymer, which is obtained by regulating the polymerization condition such as the amount of TFE gas supplied.

The polyelectrolyte polymer precursor may be one prepared by treating impure terminals and structurally easily-oxidizable moieties (CO group-, H-bonded moieties and the like) produced in a resin molecular structure during the polymerization reaction by a well-known method under fluorine gas to thereby fluorinate the moieties.

In the precursor, a part of ion-exchange group precursor groups (for example, $SO_2F$ groups) may be partially (including intermolecularly) imidized (e.g., alkylimidized).

The molecular weight of the precursor is preferably 0.05 to 50 (g/10 min) in terms of a value of a melt flow index (MFI) measured according to ASTM: D1238 (measurement conditions: a temperature of 270° C. and a load of 2,160 g), from the viewpoint of the workability in the electrolyte polymer synthesis and the strength of the electrolyte membrane.

A more preferable range of MFI of the fluorine-based polyelectrolyte polymer precursor is 0.1 to 30 (g/10 min), and a still more preferable range thereof is 0.5 to 20 (g/10 min).

The shape of the fluorine-based polyelectrolyte polymer precursor is not especially limited, but from the viewpoint of accelerating treatment rates in a hydrolysis treatment and an acid treatment described later, is preferably a pellet-shape of 0.5 cm³ or smaller, a disperse liquid or a powdery particle-shape; and among these, powdery bodies after the polymerization are preferably used. From the viewpoint of the costs, an extruded film-shape fluorine-based polyelectrolyte polymer precursor may be used.

A method for producing a fluorine-based polyelectrolyte polymer of the present embodiment from the resin precursor is not especially limited, and examples thereof include a method in which the resin precursor is extruded through a nozzle, a die, or the like by using an extruder, and thereafter is subjected to a hydrolysis treatment, and a method in which the resin precursor product as it is on the polymerization, that is, a disperse-liquid product, or a product made powdery by precipitation and filtration is thereafter subjected to a hydrolysis treatment.

A method for producing a fluorine-based polyelectrolyte polymer from the precursor is not especially limited, and examples thereof include a method in which the resin precursor is extruded through a nozzle, a die, or the like by using an extruder, and thereafter is subjected to a hydrolysis treatment, and a method in which the resin precursor product as it is on the polymerization, that is, a disperse-liquid product, or a product made powdery by precipitation and filtration is thereafter subjected to a hydrolysis treatment.

More specifically, a fluorine-based polyelectrolyte polymer precursor obtained as in the above, and as required, molded is then immersed in a basic reaction liquid to be thereby subjected to a hydrolysis treatment.

The basic reaction liquid used in the hydrolysis treatment is not especially limited, but preferable are an aqueous solution of an amine compound such as dimethylamine, diethyleamine, monomethylamine, or monoethylamine, and an aqueous solution of a hydroxide of an alkali metal or an alkaline earth metal; and especially preferable are aqueous solutions of sodium hydroxide and potassium hydroxide.

In the case of using a hydroxide of an alkali metal or an alkaline earth metal, the content thereof is not especially limited, but preferably 10 to 30% by mass with respect to the whole of a reaction liquid.

The reaction liquid more preferably further comprises a swelling organic compound such as methyl alcohol, ethyl alcohol, acetone, and dimethyl sulfoxide (DMSO). The content of a swelling organic compound is preferably 1 to 30% by mass with respect to the whole of the reaction liquid.

The fluorine-based polyelectrolyte polymer precursor is subjected to a hydrolysis treatment in the basic reaction liquid, thereafter sufficiently washed with warm water or the like, and thereafter subjected to an acid treatment.

An acid used in the acid treatment is not especially limited, but is preferably a mineral acid such as hydrochloric acid, sulfuric acid, or nitric acid, or an organic acid such as oxalic acid, acetic acid, formic acid, or trifluoroacetic acid, and more preferably a mixture of these acids and water. The above acids may be used singly or in combinations of two or more. A basic reaction liquid used in the hydrolysis treatment may be removed by a treatment with a cation-exchange resin or the like previously before the acid treatment.

An ion-exchange group precursor group of the fluorine-based polyelectrolyte polymer precursor is protonated by an acid treatment to thereby produce an ion-exchange group.

For example, in the case of a PFSA resin precursor produced using the above formula (5), W in the formula (5) is protonated by an acid treatment to thereby make $SO_3H$. A fluorine-based polyelectrolyte polymer obtained by the hydrolysis treatment and acid treatment is enabled to be dispersed or dissolved in a protonic organic solvent, water, or a mixed solvent of the both.

As described above, the electrolyte membrane constituting a redox flow secondary battery according to the present embodiment comprises an ion-exchange resin composition comprising a polyelectrolyte polymer as a main component.

The polyelectrolyte polymer includes, in addition to the above-mentioned fluorine-based polyelectrolyte polymer, a hydrocarbon-based electrolyte polymer.

The hydrocarbon-based electrolyte polymer includes a polysulfone-based polymer, and a crosslinking-type polymer obtained by copolymerizing an anion-exchange type monomer having a pyridinium group with a styrenic monomer and divinylbenzene.

<Equivalent Weight EW of a Polyelectrolyte Polymer Other than a Fluorine-Based Polyelectrolyte Polymer>

Not only in the case where a polyelectrolyte polymer in an ion-exchange resin composition contained in an electrolyte membrane used for a redox flow secondary battery according to the present embodiment is a fluorine-based polyelectrolyte polymer, but also in the case where that is another polymeric electrolyte polymer, for example, a hydrocarbon-based polyelectrolyte polymer, the equivalent weight EW (dry mass in grams of a polyelectrolyte polymer per equivalent of ion-exchange groups) is preferably regulated at 300 to 1,300 (g/eq).

The equivalent weight EW of the polyelectrolyte polymer is more preferably 350 to 1,000 (g/eq), still more preferably 400 to 900 (g/eq), and further still more preferably 450 to 750 (g/eq).

The regulation of the equivalent weight EW of a polyelectrolyte polymer in the above range can impart excellent hydrophilicity to an ion-exchange resin composition comprising the polyelectrolyte polymer, and provides an electrolyte membrane obtained using the ion-exchange resin composition with a low electric resistance and the high hydrophilicity and with a large number of smaller clusters (minute moieties where ion-exchange groups coordinate and/or adsorb water molecules), and imparts a tendency of exhibiting a high oxidation resistance (hydroxy radical resistance), a low electric resistance, and the good ion permselectivity to the electrolyte membrane.

The equivalent weight EW of a polyelectrolyte polymer is preferably 300 (g/eq) or higher from the viewpoint of the hydrophilicity and the water resistance of the membrane, and preferably 1,300 (g/eq) or lower from the viewpoint of the hydrophilicity and the low electric resistance of the electrolyte membrane. In the case where the EW of a polyelectrolyte polymer is near the lower limit value, the polyelectrolyte polymer may be modified to thereby control the solubility and the excessive swelling by subjecting a part of ion-exchange groups of side chains of the polyelectrolyte polymer to an intermolecular direct or indirect partial crosslinking reaction.

The partial crosslinking reaction is not limited to the following, but examples thereof include a reaction of an ion-exchange group with a functional group of another molecule or the main chain, a reaction of ion-exchange groups, and a crosslinking reaction (covalent bonding) through an oxidation-resistant low molecular compound, oligomer, polymeric substance or the like; and as the case may be, the reaction may be a reaction with a substance to form a salt (including an ionic bond with a $SO_3H$ group). Examples of the oxidation-resistant low molecular compound, oligomer and polymeric substance include polyhydric alcohols and organic diamines.

In cases where the partial crosslinking reaction is carried out, there are some acceptable cases even if the EW of a polyelectrolyte polymer is about 280 (g/eq). That is, the cases are effected without so much sacrificing ion-exchange groups (in other words, EW), if the water solubility is decreased (the water resistance is improved). An EW of a polyelectrolyte polymer of about 280 (g/eq) is acceptable also in, for example, the case where the polyelectrolyte polymer is in a low melt flow region (polymeric region), and has much intermolecular entanglement.

A part of functional groups of a polyelectrolyte polymer before hydrolysis may have been partially (including intermolecularly) imidized (e.g., alkylimidized).

The equivalent weight EW of a polyelectrolyte polymer can be measured by subjecting the polyelectrolyte polymer to a salt replacement, and back-titrating the solution with an alkali solution.

Specifically, the EW can be measured by a method described in Examples described later.

The equivalent weight EW of a polyelectrolyte polymer can be regulated by selecting the copolymerization ratio of monomers, kinds of the monomers, and the like.

The electrolyte membrane for a redox flow secondary battery according to the present embodiment comprises an ion-exchange resin composition, and the ion-exchange resin composition comprises a polyelectrolyte polymer as a main component, as described above.

The content of a polyelectrolyte polymer contained in the ion-exchange resin composition is preferably about 33.3 to 100% by mass, more preferably 40 to 100% by mass, and still more preferably 50 to 99.5% by mass.

An ion-exchange resin composition contained in an electrolyte membrane may comprise, in addition to the above-mentioned polyelectrolyte polymer, a predetermined material.

The predetermined material includes a polyazole-based compound, and in place thereof/in addition thereto, a basic polymer (including a low molecular weight substance such as an oligomer).

The incorporation of the above-mentioned material is likely to increase the chemical stability (mainly oxidation resistance and the like) as an ion-exchange resin composition.

These compounds partially make ion complexes in a microparticulate form or a form near molecular dispersion in the ion-exchange resin composition, and form an ionically crosslinked structure. Particularly in the case where EW of a polyelectrolyte polymer is low (for example, in the case of 300 to 500), the incorporation of a polyazole-based compound, or the incorporation, in place thereof/in addition thereto, of a basic polymer (including a low molecular weight substance such as an oligomer) in the ion-exchange resin composition is preferable from the viewpoint of the balance among the water resistance, the electric resistance, and the like.

The predetermined material contained in an ion-exchange resin composition includes a polyphenylene ether resin and/or a polyphenylene sulfide resin.

The content of the polyphenylene ether resin and/or the polyphenylene sulfide resin in an ion-exchange resin composition is preferably 0.1 to 20 parts by mass, more preferably 0.5 to 10 parts by mass, and still more preferably 1 to 5 parts by mass, with respect to 100 parts by mass of the above-mentioned polyelectrolyte polymer from the viewpoint of the strength of the membrane.

A polyelectrolyte polymer may use a partial salt (about 0.01 to 5 equivalent % of the equivalent of the whole ion-exchange group) with an alkali metal, an alkaline earth metal, or besides, a radical-decomposable transition metal (a Ce compound, a Mn compound, or the like), alone or in combination with a basic polymer.

In the case of using a fluorine-based polyelectrolyte polymer as the polyelectrolyte polymer, the fluorine-based polyelectrolyte polymer may contain fluorine-based resins (resins comprising carboxylic acid, phosphoric acid, or the like, and other well-known fluorine-based resins) other than the compounds represented by the formula (1).

In the case of using two or more of these resins, the resins may be dissolved and mixed in a solvent or dispersed and mixed in a medium, or the resin precursors may be extruded and mixed.

The fluorine-based resin is contained preferably in 30 to 50 parts by mass, more preferably in 10 to 30 parts by mass, and still more preferably 0 to 10 parts by mass, with respect to 100 parts by mass of a fluorine-based polyelectrolyte polymer represented by the formula (1) used in the present embodiment.

The equilibrium moisture content of an electrolyte membrane constituting a redox flow secondary battery according to the present embodiment is preferably 5% by mass or higher, more preferably 10% by mass or higher, and still more preferably 15% by mass or higher. The upper limit thereof is preferably 80% by mass or lower, more preferably 50% by mass or lower, and still more preferably 40% by mass or lower If the equilibrium moisture content of an electrolyte membrane is 5% by mass or higher, the electric resistance, the current efficiency, the oxidation resistance, and the ion permselectivity of the electrolyte membrane are likely to be good.

By contrast, if the equilibrium moisture content is 80% by mass or lower, the dimensional stability and the strength of the electrolyte membrane are likely to be good and the increase of water-soluble components is likely to be suppressed. The equilibrium moisture content of an electrolyte membrane is expressed as an equilibrium (being left for 24 hours) saturated water absorption rate (Wc) at 23° C. and 50% relative humidity (RH), based on the membrane prepared by forming a membrane from a dispersion liquid of a predetermined resin composition constituting the electrolyte membrane with water and an alcoholic solvent and drying the membrane at 160° C. or lower.

The equilibrium moisture content of an electrolyte membrane can be regulated by the similar method as in the equivalent weight EW of the above-mentioned polyelectrolyte polymer.

Specifically, the EW can be regulated by selecting the copolymerization ratio of monomers of a polyelectrolyte polymer constituting an electrolyte membrane, kinds of the monomers, and the like.

<Reinforcing Material>

An electrolyte membrane for a redox flow secondary battery according to the present embodiment has a reinforcing material as described above.

The electrolyte membrane for a redox flow secondary battery according to the present embodiment preferably has a structure in which a reinforcing material is impregnated with the above-mentioned polyelectrolyte polymer, and the internal volume of the reinforcing material is substantially occluded.

Here, "a structure in which the internal volume is substantially occluded" is a structure in which the internal volume of the reinforcing material is impregnated with the polyelectrolyte polymer, and the internal volume is substantially occluded, and specifically, is a state that the impregnation of the reinforcing material with the polyelectrolyte polymer allows occluding 90% or more of the internal volume of the reinforcing material.

By making such a structure in which the internal volume of an electrolyte membrane is substantially occluded, the volume change of the polyelectrolyte polymer due to the impregnation with an electrolyte solution is suppressed when the electrolyte membrane is brought in contact with the electrolyte solution, resulting in providing an effect of improving the current efficiency and the electric resistance.

The ratio at which a reinforcing material is impregnated with a polyelectrolyte polymer can be determined as follows.

An electrolyte membrane was cut-processed along the membrane thickness direction; and a cross-section emerging thereby was observed by a scanning electron microscope (SEM) at a magnification of 30,000× to determine a cross-sectional area of a reinforcing material layer. Void portions and portions other than those from the acquired image are binarized; and the sum total of the area of the void portions is calculated and the void ratio of the reinforcing material layer is determined from the following expression.

Ratio of polymer impregnation of a reinforcing material layer (%)=100−{[the sum total of the void area ($\mu m^2$)/the cross-sectional area of the reinforcing material layer ($\mu^2$)]×100}

The ratio of polyelectrolyte polymer impregnation of a reinforcing material layer is preferably 80% or higher, more preferably 80% to 90%, and still more preferably 90% or higher.

By making the ratio of polyelectrolyte polymer impregnation of a reinforcing material layer in the above-mentioned range, phenomena are likely to be suppressed that are the rise in the electric resistance and the decrease in the current efficiency after the cycle test, due to the infiltration of an electrolyte solution into the void portions and the excessive expansion of an electrolyte membrane when the electrolyte membrane is immersed in the electrolyte solution.

A method of regulating the ratio of polyelectrolyte polymer impregnation of a reinforcing material layer includes a method in which when a dispersion liquid of an ion-exchange resin composition with water and an alcoholic solvent is prepared, the compositional ratio of the water and the alcoholic solvent is varied, and a method in which in order to raise the impregnatability of a reinforcing material, the amount and the molecular weight of a surfactant to be added to the dispersion liquid are varied.

[Reinforcing Material Composed of a Fluorine-Based Microporous Membrane]

The first form of an electrolyte membrane for a redox flow secondary battery according to the present embodiment has a reinforcing material composed of a fluorine-based microporous membrane.

The fluorine-based microporous membrane is not especially limited as long as being good in the affinity for a fluorine-based polyelectrolyte polymer; and examples thereof include a microporous membrane composed of a polytetrafluoroethylene (PTFE), and a polytetrafluoroethylene (PTFE)-based membrane stretched and made porous is preferable.

A reinforcing material in which the PTFE-based membrane is substantially voidlessly filled with a fluorine-based polyelectrolyte polymer is more preferable from the viewpoint of the strength of a thin membrane and the suppression of the dimensional change in the plane (vertical and horizontal) direction. A reinforcing material impregnated with the fluorine-based polyelectrolyte polymer can be obtained by impregnating the reinforcing material composed of a fluorine-based microporous membrane with a reasonable amount of a dispersion liquid, with an organic solvent or an alcohol-water as a solvent, of an ion-exchange resin composition in a reasonable concentration and drying the impregnated reinforcing material.

The solvent used in production of a reinforcing material impregnated with a fluorine-based polyelectrolyte polymer as described above is not especially limited, but is, for example, preferably a solvent having a boiling point of 250° C. or lower, more preferably a solvent having a boiling point of 200° C. or lower, and still more preferably a solvent having a boiling point of 120° C. or lower. Among these, water and aliphatic alcohols are preferable, and the solvent specifically includes water, methanol, ethanol, 1-propanol, 2-propanol, 1-butanol, 2-butanol, isobutyl alcohol, and tert-butyl alcohol. The solvents may be used singly or in combinations of two or more.

A method for producing a PTFE microporous membrane suitably used as a reinforcing material composed of a fluorine-based microporous membrane is not especially limited, but a stretched PTFE microporous membrane is preferable from the viewpoint of suppressing the dimensional change of an electrolyte membrane.

Examples of production methods of a stretched PTFE microporous membrane include well-known methods as disclosed in Japanese Patent Laid-Open No. 51-30277, National Publication of International Patent Application No. 1-01876, Japanese Patent Laid-Open No. 10-30031, and the like.

Specifically, first, a liquid lubricant such as solvent naphtha or white oil is added to a fine powder obtained by coagulating an emulsion-polymerized PTFE aqueous dispersion liquid, and the mixture is extruded as a bar-shape paste. Thereafter, the bar-shape paste extrudate (cake) is rolled to thereby obtain a PTFE unbaked body. The unbaked tape at this time is stretched in the longitudinal direction (MD direction) and/or traverse direction (TD direction) at an optional stretch ratio. At the stretch time or after the stretch, the liquid lubricant filled in the extrusion time is removed by heating or extraction to thereby obtain a stretched PTFE microporous membrane.

The reinforcing material composed of a fluorine-based microporous membrane, as required, may contain well-known additives such as a non-fiberizing material (for example, a low molecular weight PTFE), an ultraviolet absorbent, a light stabilizer, an antistatic agent, an antifogging agent, and a coloring pigment in the range of not impairing the object achievement and the advantage of the present invention.

In the reinforcing material composed of a fluorine-based microporous membrane, the distribution center (peak) of the pore distribution is a pore diameter preferably in the range of 0.08 μm to 5.0 μm, more preferably in the range of 0.1 to 4.0 μm, and still more preferably in the range of 0.3 to 3.0 μm. Here, the pore distribution of a fluorine-based microporous membrane refers to values measured by a bubble point·half dry method using the bubble point method described in JIS-K-3832. If the distribution center of the pore diameter is 0.08 μm or larger, since additives having the hydrogen peroxide-inhibiting effect and the like, and an electrolyte solution can easily be filled so that the generation of voids in the electrolyte membrane can be suppressed, and that a sufficient filling speed of a polyelectrolyte polymer can be secured, the processability is likely to be excellent. If the distribution center of the pore diameter is 5.0 μm or smaller, the dimensional change of the electrolyte membrane can be suppressed, and a sufficient reinforcing affect of the membrane is likely to be provided.

The distribution center of the pore distribution of a reinforcing material composed of a fluorine-based microporous membrane, from the viewpoint of the initial power generation property, is preferably 0.1 μm or larger, more preferably 0.3 μm or larger, still more preferably 0.5 μm or larger, and further still more preferably 0.7 μm or larger. The distribution center of the pore distribution of a fluorine-based microporous membrane, from the viewpoint of the reinforcing effect of an electrolyte membrane, is preferably 4.5 μm or smaller, more preferably 4.0 μm or smaller, still more preferably 3.5 μm or smaller, and further still more preferably 3.0 μm or smaller.

In the pore distribution of a reinforcing material composed of a fluorine-based microporous membrane, the amount of the pores present, whose pore diameters are 0.08 μm to 5.0 μm, of the fluorine-based microporous membrane is preferably 0.5 or higher (number ratio). Here, "the amount of pores present" of a microporous membrane refers to a ratio of the number of the pores whose pore diameters are in the range of 0.08 μm to 5.0 μm to the total number of pores of the microporous membrane, as measured in the pore diameter measurement range of 0.065 μm to 10.0 μm by a bubble point·half dry method using the bubble point method described in JIS-K-3832. If the amount of the pores present, whose pore diameters are 0.08 μm to 5.0 μm, of a fluorine-based microporous membrane is regulated at 0.5 or higher (number ratio), since the pore diameters of the fluorine-based microporous membrane become relatively uniform, a polyelectrolyte polymer is easily filled uniformly in voids of the fluorine-based microporous membrane. As a result, in the case where the polyelectrolyte polymer comprises additives, since the additives can be uniformly dispersed in an electrolyte membrane, voids are hardly generated in the electrolyte membrane, and the electrolyte membrane is likely to further develop high chemical durability. In the case where the additives have no protonic conductivity, making pore diameters of the fluorine-based microporous membrane nearly equal to or larger than the median diameters of the additives can regulate so that the pores of the fluorine-based microporous membrane are not occluded by the additives. This results in indicating that the protonic conduction in the electrolyte membrane is likely to be smoothly carried out with no inhibition by anything, and allowing development of an excellent effect of improving the initial property of the electrolyte membrane.

The amount of the pores present, whose pore diameters are 0.08 µm to 5.0 µm, of a reinforcing material composed of a fluorine-based microporous membrane is more preferably 0.7 or higher, still more preferably 0.8 or higher, further still more preferably 0.9 or higher, and much further still more preferably 1.

The amount (number ratio) of the pores present, whose pore diameters are 0.5 µm to 5.0 µm, of a reinforcing material composed of a fluorine-based microporous membrane is preferably 0.5 or higher, more preferably 0.7 or higher, still more preferably 0.8 or higher, further still more preferably 0.9 or higher, and especially preferably 1.

The amount (number ratio) of the pores present, whose pore diameters are 0.7 µm to 5.0 µm, of a reinforcing material composed of a fluorine-based microporous membrane is preferably 0.5 or higher, more preferably 0.7 or higher, still more preferably 0.8 or higher, further still more preferably 0.9 or higher, and especially preferably 1.

A reinforcing material composed of a fluorine-based microporous membrane preferably has at least two distribution centers in the pore distribution.

If the pore distribution of a fluorine-based microporous membrane has two distribution centers, since the pores have portions playing separate roles in which (i) the distribution center whose pore diameter is larger plays a role of the promotion of the discharge of a reaction product water and the easy filling property of additives; and (ii) the distribution center whose pore diameter is smaller plays a role of the suppression of the volume swelling of the electrolyte by the mechanical strength of the microporous membrane, the electrolyte membrane comprising the fluorine-based microporous membrane is likely to easily simultaneously satisfy both the chemical durability and the physical durability.

The numerical values of pore diameters of a reinforcing material composed of a fluorine-based microporous membrane can be regulated in the above range by the production conditions of the kind of a lubricant, the dispersibility of the lubricant, the stretch ratio of the microporous membrane, the lubricant-extracting solvent, the heat treatment temperature, the heat treatment time, the extraction time, and the extraction temperature.

A reinforcing material composed of a fluorine-based microporous membrane may have a constitution composed of a single layer(s), or as required, a plurality of layers.

The plurality of layers are preferable from the viewpoint that faults do not propagate though faults such as voids and pinholes may be generated in each single layer.

By contrast, from the viewpoint of the filling property of a polyelectrolyte polymer and additives, a single layer(s) is preferable. A method of making a fluorine-based microporous membrane in a plurality of layers includes a method of adhering two or more single layers by thermal lamination, and a method of stacking and rolling a plurality of cakes.

In a fluorine-based microporous membrane, at least one of elastic moduli thereof in the mechanical flow direction (MD) in the production, and in the direction (TD) perpendicular thereto is preferably 1,000 MPa or lower, more preferably 500 MPa or lower, and still more preferably 250 MPa or lower. Making the elastic modulus of a microporous membrane 1,000 MPa or lower improves the dimensional stability of an electrolyte membrane. The elastic modulus of a fluorine-based microporous membrane refers to a value measured according to JIS-K7113.

The protonic conduction of a polyelectrolyte polymer is enabled by the polyelectrolyte polymer absorbing water and ion-exchange groups being hydrated. Therefore, the higher the ion-exchange group density and the larger the ion-exchange capacity, the higher the conductivity at the same humidity. The higher the humidity, the higher the conductivity.

A polyelectrolyte polymer in the case of having a high sulfone group density, though exhibiting a high conductivity even at a low humidity, has a problem of extremely hydrating at a high humidity. For example, in the operation of a redox flow secondary battery, starting and stopping are usually carried out once or more times in one day, and the humidity change at this time leads to repetition of swelling and contraction in an electrolyte membrane. The repetition of such dry and wet dimensional changes of an electrolyte membrane gives disadvantages on both aspects of the performance and the durability. A polyelectrolyte polymer in the case of having a high ion-exchange capacity easily hydrates, and exhibits large dry and wet dimensional changes if an electrolyte membrane is formed in the state of the polyelectrolyte polymer as it is.

However, the use of a reinforcing material composed of a fluorine-based microporous membrane having an elastic modulus of 1,000 MPa or lower relaxes the stress due to the volume change of the electrolyte membrane by the reinforcing material composed of a fluorine-based microporous membrane, and allows the suppression of the dimensional change. By contrast, if the elastic modulus of a reinforcing material composed of a fluorine-based microporous membrane is too low, the strength of an electrolyte membrane is likely to be decreased. Therefore, the elastic modulus of a reinforcing material composed of a fluorine-based microporous membrane is preferably 1 to 1,000 MPa, more preferably 10 to 800 MPa, and still more preferably 100 to 500 MPa.

In a reinforcing material composed of a fluorine-based microporous membrane, the porosity is preferably 50% to 90%, more preferably 60% to 90%, still more preferably 60% to 85%, and further still more preferably 50% to 85%.

Making the porosity in the range of 50% to 90% is likely to satisfy simultaneously all the improvement of the ionic conductivity of an electrolyte membrane, the improvement of the strength of the electrolyte membrane, and the suppression of the dimensional change thereof.

Here, the porosity of a reinforcing material composed of a fluorine-based microporous membrane refers to a value measured by the mercury penetration method using a mercury porosimeter (for example, made by Shimadzu Corp., trade name: AutoPore IV 9520, initial pressure: about 20 kPa).

The numerical value of the porosity of a reinforcing material composed of a fluorine-based microporous membrane can be regulated in the above range by the pore number, the pore diameter, and the pore shape, the stretch ratio, the amount of a liquid lubricant added, and the kind of the liquid lubricant in the reinforcing material composed of a fluorine-based microporous membrane.

Examples of means to raise the porosity of a reinforcing material composed of a fluorine-based microporous membrane include a method of regulating the amount of a liquid lubricant added at 5 to 50% by mass. Making the amount of a liquid lubricant added in this range, because of maintaining the moldability of a resin constituting the reinforcing material composed of a fluorine-based microporous membrane, and also making the plasticization effect sufficient, allows highly fibrillating fibers of the resin constituting the reinforcing material composed of a fluorine-based microporous membrane in biaxial directions, and allows efficiently increasing the stretch ratio. Examples of means to reversely lower the porosity include the reduction of the amount of the liquid lubricant, and the reduction of the stretch ratio.

In a reinforcing material composed of a fluorine-based microporous membrane, the membrane thickness is preferably 0.1 µm to 50 µm, more preferably 0.5 µm to 30 µm, still more preferably 1.0 µm to 20 µm, and further still more preferably 2.0 µm to 20 µm.

Making the membrane thickness in the range of 0.1 µm to 50 µm allows filling pores in the reinforcing material composed of a fluorine-based microporous membrane with a polyelectrolyte polymer, and gives a tendency of suppressing the dimensional change of an electrolyte membrane. Here, the membrane thickness of a reinforcing material composed of a fluorine-based microporous membrane refers to a value measured by sufficiently leaving the membrane constituting the reinforcing material in a 50% RH constant-temperature constant-humidity chamber, and thereafter using a well-known film thickness meter (for example, made by Toyo Seiki Seisaku-sho, Ltd., trade name: "B-1").

The numerical value of the membrane thickness of a reinforcing material composed of a fluorine-based microporous membrane can be regulated in the above range by the amount of the solid content of a cast solution, the amount of the extrusion resin, the extrusion speed, and the stretch ratio of the reinforcing material composed of a fluorine-based microporous membrane.

A reinforcing material composed of a fluorine-based microporous membrane, in order to reduce the contraction, is preferably further subjected to a heat setting treatment. Carrying out the heat setting treatment allows reducing the contraction of the reinforcing material composed of a fluorine-based microporous membrane in a high-temperature atmosphere, and reducing the dimensional change of an electrolyte membrane. The heat setting is carried out on the reinforcing material composed of a fluorine-based microporous membrane by relaxing the stress in the TD (traverse direction) direction in the temperature range of the melting point or lower temperatures of raw materials of the fluorine-based microporous membrane, for example, by a TD (traverse direction) tenter. In the case of PTFE suitable as a reinforcing material composed of a fluorine-based microporous membrane, a preferable stress relaxation temperature range is 200° C. to 420° C.

A reinforcing material composed of a fluorine-based microporous membrane, as required, may be subjected to surface treatments such as surfactant coating and chemical modification in the range of not impairing the problem resolution and the advantage of the present invention. Subjecting to surface treatments allows hydrophilizing the surface of the microporous membrane, giving an effect of the high filling property of a polyelectrolyte polymer, and additionally regulating the moisture content of an electrolyte membrane.

[Reinforcing Material Composed of a Nonwoven Fabric and/or a Hydrocarbon-Based Microporous Membrane]

The second form of an electrolyte membrane for a redox flow secondary battery according to the present embodiment has a reinforcing material composed of a nonwoven fabric and/or a hydrocarbon-based microporous membrane.

The nonwoven fabric is not especially limited as long as being good in the affinity for a polyelectrolyte polymer; and examples thereof include, but are not limited to, nonwoven fabrics composed of polyester fibers, glass fibers, aramid fibers, polyphenylene sulfide fibers, nanofiber fibers, nylon fibers, cellulose fibers, vinylon fibers, polyolefin fibers, and rayon fibers.

Among the above, polyester fibers are preferable from the viewpoint of the dimensional change in the hydrous time, and particularly preferable is a polymer composed of a structural unit represented by the following general formula (I), the polymer being an aromatic liquid crystal polyester classified in a thermotropic liquid crystal polyester.

[Formula 1]

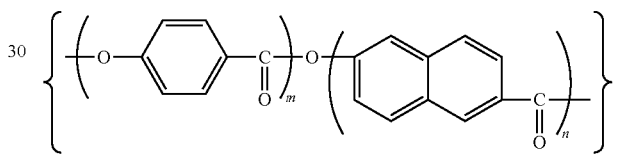

(I)

In the formula (I), the ratio of m to n is optional, and the polyester may be a homopolymer of either, or a copolymer thereof. The polyester may be a random polymer or a block polymer.

The membrane thickness of a nonwoven fabric is not especially limited, but is preferably 5 to 50 µm and more preferably 10 to 50 µm. In the case where the membrane thickness of a nonwoven fabric is 50 µm or smaller, the electric resistance decreases and the battery performance is likely to be improved; in the case of 5 µm or larger, there arises only a low risk of causing defects such as breakage in an impregnation process or the like of a fluorine-based polyelectrolyte polymer, and the mechanical property is likely to become sufficient.

The porosity of a nonwoven fabric is not especially limited, but is preferably 40 to 95%, more preferably 50 to 90%, and still more preferably 60 to 80%.

In the case where the porosity of a nonwoven fabric is 95% or lower, the durability of a battery is likely to be improved along with the improvement of the dimensional stability of an electrolyte membrane; and in the case of 40% or higher, the ionic conductivity as an electrolyte membrane is likely to be improved.

Raw materials of a hydrocarbon-based microporous membrane are not especially limited; and for example, polyamide resins, polyimide resins, polyolefin resins, and polycarbonate resins can be used singly or as a mixture thereof, but polyolefin resins are preferably used as the raw material from the viewpoint of moldability and handleability.

A polyolefin resin used as a raw material of a hydrocarbon-based microporous membrane is preferably a polymer comprising propylene or ethylene as a main monomer component. The polyolefin resin may be composed only of the above main monomer components, but may additionally contain monomer components such as butane, pentene, hexene, and 4-methylpentene.

Specific examples of the polyolefin resins include ultrahigh-molecular-weight polyethylene (UHMWPE), high-density polyethylene (HDPE), medium-density polyethylene, low-density polyethylene (LDPE), polyethylenes such as straight-chain low-density polyethylene and ultralow-density polyethylene obtained using a Ziegler-type multisite catalyst, polypropylene, ethylene-vinyl acetate copolymers, ethylenic polymers obtained using a single site catalyst, and copolymers of propylene with other monomers copolymerizable therewith (propylene-ethylene copolymers, propylene-ethylene-α-olefin copolymers, and the like).

The polyolefin resins may be used singly or in combination.

Among the above, from the viewpoint of moldability of the hydrocarbon-based microporous membrane, polyethylene is preferable; ultrahigh-molecular-weight polyethylene and high-density polyethylene are more preferable; and ultrahigh-molecular-weight polyethylene is still more preferable.

From the viewpoint of the moldability and the physical properties (mechanical strength, porosity, and membrane thickness) of the hydrocarbon-based microporous membrane, an ultrahigh-molecular-weight polyethylene has a weight-average molecular weight of preferably $1 \times 10^5$ or higher, more preferably $3 \times 10^5$ or higher, still more preferably $5 \times 10^5$ or higher, and especially preferably $5 \times 10^5$ to $15 \times 10^6$. From the viewpoint of the heat resistance, polypropylene is preferable.

The hydrocarbon-based microporous membrane preferably has a multilayer structure.

The multilayer structure refers to a piecrust-shape multilayer structure in which a resin layer and an air layer are alternately stacked in the thickness direction. That is, a hydrocarbon-based microporous membrane has a multilayer structure laminated as in second layer, third layer, fourth layer, . . . like piecrusts, and is different from conventional microporous membranes having a three-dimensional network structure. Use of a hydrocarbon-based microporous membrane having such a multilayer structure can more improve the dimensional change stability and the mechanical strength of an electrolyte membrane as compared with the use of a conventional microporous membrane having a three-dimensional network structure. Here, "air layer" refers to a space between resin layers adjacent in the membrane thickness direction (between piecrusts).

The mechanism in which the use of a hydrocarbon-based microporous membrane having a multilayer structure can more improve the dimensional change stability and the mechanical strength of an electrolyte membrane is considered as follows.

Although a polyelectrolyte polymer filled in a hydrocarbon-based microporous membrane is usually considered to be able to stop the propagation of the deterioration of the polyelectrolyte at the interface with the hydrocarbon-based microporous membrane portion, in the case where the moisture content of the polyelectrolyte polymer is high, a part of the hydrocarbon-based microporous membrane cannot withstand the stress by the volume change of the remarkably swelled polyelectrolyte polymer to thereby cause creep-deformation in some cases. At this time, if the hydrocarbon-based microporous membrane has a single-layer structure, since the dimensional change suppression effect is reduced from portions creep-deformed, and the deterioration of the electrolyte membrane is accelerated and the mechanical strength is reduced, resultantly, the durability cannot be developed in some cases. However, if the hydrocarbon-based microporous membrane has a multilayer structure, the stress by the volume change of the polyelectrolyte is allowed to be suitably diffused though the details are not clear. By the mechanism presumed as described above, the combination of a hydrocarbon-based microporous membrane having a multilayer structure with an electrolyte polymer can develop the durability in a higher level.

With respect to a method for producing such a hydrocarbon-based microporous membrane having a piecrust-shape multilayer structure in which a resin layer and an air layer are alternately stacked in the thickness direction, in the case where a raw material is a polyolefin resin, the hydrocarbon-based microporous membrane can be produced, for example, by substantially gelling and forming the resin as a membrane thereof, and stretching the resulting gelled sheet as disclosed in Japanese Patent Laid-Open No. 2-232242.

For example, organic or inorganic particles are dispersed in a suitable gelling solvent by using a milling apparatus or the like; thereafter, a polyolefin resin as a binder and the remainder of the suitable gelling solvent are added; and the polyolefin and the solvent are heated and dissolved to thereby solate the mixture. The solated composition thus obtained is formed into a tape-shape at a temperature equal to or higher than the gelling temperature of the composition; and the tape-shape material is quenched to a temperature equal to or lower than the gelling temperature to thereby produce a gelled sheet. The gelled sheet is stretched uniaxially or biaxially at a temperature equal to or higher than the glass transition temperature of the polyolefin resin, and thereafter thermally fixed to be thereby able to produce a polyolefin microporous membrane having a multilayer structure. The gelling solvent, in the case where the polyolefin resin is polyethylene, usually includes decalin (decahydronaphthalene), xylene, hexane, and paraffin. The gelling solvent may be a mixed solvent of two or more.

The layer gap of the air layer of the hydrocarbon-based microporous membrane is preferably 0.01 μm to 20 μm from the viewpoint of the layer gap retainability and the moldability. The layer gap of the air layer is more preferably 0.01 μm to 10 μm, still more preferably 0.05 μm to 5 μm, and further still more preferably 0.1 μm to 3 μm. The regulation of the layer gap of the air layer in the above range gives a tendency of making the effects of the high filling property of a polyelectrolyte polymer and the dimensional change stability of an electrolyte membrane more remarkable. Here, the layer gap of the air layer can be observed by a cross-sectional photograph using a scanning electron microscope (SEM).

A reinforcing material, in which an ion-exchange resin composition comprising a polyelectrolyte polymer as a main component is substantially voidlessly filled in a nonwoven fabric and/or a hydrocarbon-based microporous membrane, is more preferable from the viewpoint of the strength of the thin membrane and from the viewpoint of suppression of the dimensional change in the plane (longitudinal and traverse) direction.

The reinforcing material can be obtained by impregnating a nonwoven fabric and/or a hydrocarbon-based microporous membrane with a reasonable amount of a dispersion liquid, with an organic solvent or an alcohol-water as a solvent, of an ion-exchange resin composition in a reasonable concentration, and drying the impregnated material.

A solvent used in the production of a reinforcing material is not especially limited, but is preferably a solvent having a boiling point of 250° C. or lower, more preferably a solvent having a boiling point of 200° C. or lower, and still more preferably a solvent having a boiling point of 120° C. or lower.

Among these, water and aliphatic alcohols are preferable; and the solvent specifically includes water, methanol, ethanol, 1-propanol, 2-propanol, 1-butanol, 2-butanol, isobutyl alcohol, and tert-butyl alcohol. The solvents may be used singly or in combinations of two or more.

A nonwoven fabric and/or a hydrocarbon-based microporous membrane used as a reinforcing material of an electrolyte membrane may be subjected to a surface treatment.

If a surface treatment is carried out, the subsequent impregnation with a polyelectrolyte can suitably be carried out. Examples of such a surface treatment include a corona discharge treatment, an ultraviolet irradiation treatment, and a plasma treatment. Further for the purpose of enhancing the impregnatability and the adhesivity, the surface of a base material may be in advance wetted with a solvent used for an impregnating liquid; an impregnating liquid may be diluted and coated; or a solution of a basic polymer or the like may be in advance coated on a base material.

That an electrolyte membrane has a reinforcing material composed of a nonwoven fabric and/or a hydrocarbon-based microporous membrane allows improving the strength and further suppressing the dimensional change in the plane (longitudinal and traverse) direction.

The dimensional change in the plane direction of an electrolyte membrane is preferably 20% or lower, and more preferably 15% or lower. If the dimensional change in the plane direction of an electrolyte membrane is 20% or lower, the stress to a battery cell becomes low and the durability is likely to be improved.

The breaking strength of an electrolyte membrane is preferably 200 kgf/cm$^2$ or higher, and more preferably 300 kgf/cm$^2$ or higher. If the breaking strength of an electrolyte membrane is 200 kgf/cm$^2$ or higher, the suppression of the dimensional change is likely to become easy.

[Reinforcing Material Composed of a Woven Fabric]

The third form of an electrolyte membrane for a redox flow secondary battery according to the present embodiment has a reinforcing material composed of a woven fabric.

The woven fabric is not especially limited as long as being good in the affinity for a polyelectrolyte polymer, and examples thereof include woven fabrics of fluorine fibers, polyester fibers, glass fibers, aramid fibers, polyphenylene sulfide fibers, nanofiber fibers, nylon fibers, cellulose fibers, vinylon fibers, polyolefin fibers, and rayon fibers. Among the above, fluorine fibers are preferable and above all, PTFE fibers are preferable, from the viewpoint of the affinity for a polyelectrolyte polymer.

A method for producing a reinforcing material composed of a woven fabric is not especially limited, and examples thereof include plain weave, twill weave, and satin weave.

Fibers used in a woven fabric may be filaments or multifilaments; but, since the case of multifilaments allows flattening of the yarn cross-section, even if the porosity of the woven fabric is made low, the rise of the resistance of an electrolyte membrane can be made low, which is therefore preferable.

The membrane thickness of a reinforcing material composed of a woven fabric is not especially limited, but is preferably 5 to 50 μm, and more preferably 10 to 50 μm.

In the case where the membrane thickness of a reinforcing material composed of a woven fabric is 50 μm or smaller, the electric resistance becomes low and the battery performance is likely to be improved; and in the case of 5 μm or larger, there arises only a low risk of causing defects such as breakage in an impregnation process or the like of a fluorine-based polyelectrolyte polymer, and the mechanical property is likely to become sufficient.

The porosity of a reinforcing material composed of a woven fabric is not especially limited, but is preferably 40 to 95%, more preferably 50 to 90%, and still more preferably 60 to 80%. In the case where the porosity of a woven fabric is 95% or lower, the durability of a battery is likely to be improved along with the improvement of the dimensional stability of an electrolyte membrane; and in the case of 40% or higher, the ionic conductivity as an electrolyte membrane is likely to be improved.

(Method for Producing an Electrolyte Membrane)

A production method of an electrolyte membrane (membrane formation method) is not especially limited, and a well-known extrusion method or cast membrane formation method can be used.

The electrolyte membrane may be of a single layer or of a multilayer (2 to 5 layers); and in the case of a multilayer, the performance of the electrolyte membrane can be improved by laminating membranes having different properties (for example, resins having different EWs and functional groups).

In the case of a multilayer, the lamination may be carried out at the extrusion membrane production time or the cast time, or each membrane obtained may be laminated.

The electrolyte membrane formed in the above method is sufficiently washed with water (or, as required, before water washing, treated with an aqueous acidic liquid such as dilute hydrochloric acid, nitric acid, or sulfuric acid) to thereby remove impurities, and is preferably subjected to a heat treatment in the air (preferably in an inert gas) at 130 to 200° C., preferably at 140 to 180° C., and more preferably 150 to 170° C., for 1 to 30 min.

The time of the heat treatment is more preferably 2 to 20 min, still more preferably 3 to 15 min, and especially preferably about 5 to 10 min.

The reason for carrying out the above treatment will be described below.

First, since in the state as it is at the membrane formation time, sufficient entanglements among particles (among primary particles and secondary particles) and molecules originated from raw materials are not made, the treatment is useful for the purpose of making interparticulate and intermolecular entanglements, particularly in order to stabilize the water resistance (particularly decreasing the hot water-dissolving component ratio) and the saturated water absorption rate of water, and produce stable clusters.

The treatment is useful also from the viewpoint of the improvement of the membrane strength.

Particularly in the case of using the cast membrane formation method, the treatment is useful.

Another reason therefor is because the formation of fine intermolecular crosslinking among molecules of a polyelectrolyte polymer contributes to the formation of water-resistant and stable cluster, and further provides an effect of making the cluster diameter uniform and small.

Further another reason is because the treatment causes at least a part of ion-exchange groups of a polyelectrolyte polymer in an ion-exchange resin composition to react with active reaction sites (aromatic rings and the like) of other additive (including resins) components to thereby form fine crosslinking through the reaction (particularly the reaction of ion-exchange groups present near the other resin components being dispersed additives) and contribute to the stabilization. The degree of the crosslinking is, in terms of EW (the degree of the EW decrease before and after the heat treatment), preferably 0.001 to 5%, more preferably 0.1 to 3%, and still more preferably about 0.2 to 2%.

In the case of carrying out an excessive treatment exceeding the upper limits of the above treatment conditions (time, temperature), the oxidative deterioration resistance during actual usage as an electrolyte membrane is likely to be degraded, with the degradation starting from faults generated in the molecular structure due to the increase of fluorine removal, hydrofluoric acid removal, sulfonic acid removal and thermally oxidized sites, and the like. By contrast, in the case of carrying out a treatment below the lower limits of the above treatment conditions, the above-mentioned effect of the treatment becomes insufficient in some cases.

The electrolyte membranes constituting a redox flow secondary battery in the present embodiments are excellent in the ion permselectivity, low in the electric resistance, and excellent also in the durability (mainly the hydroxy radical oxidation resistance), and exhibit excellent performance as a diaphragm for a redox flow secondary battery.

Here, each physical property in the present specification can be measured according to methods described in the following Examples unless otherwise specified.

EXAMPLES

Then, the present embodiments will be described more specifically by way of Examples and Comparative Examples, but the present embodiments are not limited to the following Examples unless going over their gist.
[Measurement Methods]
(1) The Melt Flow Index (MFI) of a PFSA Resin Precursor which is a Polyelectrolyte Polymer The melt flow index was measured according to ASTM: D1238 under the measurement conditions of a temperature of 270° C. and a load of 2,160 g.
(2) The Measurement of an Equivalent Weight EW of a PFSA Resin which is a Polyelectrolyte Polymer 0.3 g of a PFSA resin which is a polyelectrolyte polymer was immersed in 30 mL of a saturated NaCl aqueous solution at 25° C., and left for 30 min under stirring.

Then, free protons in the saturated NaCl aqueous solution was subjected to a neutralization titration using a 0.01 N sodium hydroxide aqueous solution with phenolphthalein as an indicator. The PFSA resin content, obtained after the neutralization, in which counter ions of ion-exchange groups were in the sodium ion state was rinsed with pure water, further vacuum-dried, and weighed.

The amount of substance of sodium hydroxide used for the neutralization was taken as M (mmol), and the mass of the PFSA resin in which counter ions of the ion-exchange groups were in the sodium ion state was taken as W (mg); and the equivalent weight EW (g/eq) was determined from the following expression.

$$EW=(W/M)-22$$

(3) Membrane Thickness (μm)

An electrolyte membrane sample was allowed to stand still in a 23° C., 50% RH constant-temperature constant-humidity chamber for 1 hour or longer, and thereafter, the membrane thickness was measured using a film thickness meter (made by Toyo Seki Seisaku-sho, Ltd., trade name: "B-1").

(4) The Pore Distribution of a Reinforcing Material

The pore distribution of a microporous membrane constituting a reinforcing material was measured as follows.

First, a microporous membrane sample was cut out into a size of ϕ25 mm, and the pore distribution was measured using a through-pore distribution/gas and liquid permeability analyzer (made by Xonics Corp., analyzer name: Porometer 3G).

The measurement by this analyzer is based on the bubble point method described in JIS-K-3832; first, the pore volume of the microporous membrane was completely filled with a test-dedicated liquid (Porofil (registered trademark)), and thereafter, by gradually increasing a pressure exerted on the microporous membrane, the pore distribution was determined from the surface tension of the test-dedicated liquid, the applied gas pressure, and the amount of feed flow (bubble point-half dry method).

The pore distribution of a microporous membrane was measured in the pore measurement range of 0.065 μm to 10.0 μm using a compressed air as a flow gas, and the distribution center of the pore distribution was determined.

The presence ratio of pores was calculated by the following expression.

(Presence ratio of pores)=(the number of pores present in the pore diameter range of 0.3 μm to 5.0 μm)/(the total number of pores of a microporous membrane present between the pore diameter of 0.065 μm to 10.0 μm)

(5) The Elastic Modulus (MPa) of a Reinforcing Material

A membrane sample was cut out into a rectangular membrane of 70 mm×10 mm, and elastic moduli were measured in each dimensional (longitudinal (MD) direction and width (TD) direction) direction in the plane direction according to JIS K-7127.
(6) The Porosity (%) of a Reinforcing Material The porosity was measured by the mercury penetration method using a mercury porosimeter (made by Shimadzu Corp., trade name: AutoPore IV 9521, initial pressure: about 20 kPa).
(7) The Plane-Direction Dimensional Change of an Electrolyte Membrane A membrane sample was cut out into a rectangular membrane of 4 cm×3 cm, and left in a constant-temperature constant-humidity chamber (23° C., 50% RH) for 1 hour or longer; and thereafter, each dimension in the plane direction of the rectangular membrane sample in the dry state was measured.

Then, the rectangular membrane sample whose dimension had been measured was boiled in hot water at 80° C. for 1 hour to thereby make the electrolyte membrane sufficiently absorb water so that the electrolyte membrane reached a moistened state in which the amount of mass variation by moisture became 5% or lower (so that the volume swelling by moisture absorption reached saturation). At this time, the membrane was taken out from the hot water, and whether the amount of mass variation became 5% or lower in the state that moisture on the surface was sufficiently removed was checked by an electronic balance.

This membrane sample in the moistened state swollen by the water absorption was taken out from the hot water, and each dimension (longitudinal (MD) direction and width (TD) direction) in the plane direction was measured.

A value obtained by averaging increments in each dimension in the plane direction in the moistened state based on the each dimension in the plane direction in the dry state was taken as a plane-direction dimensional change (%).

(8) Measurement of an Equilibrium Moisture Content of an Electrolyte Membrane

A dispersion liquid of a PFSA resin being a polyelectrolyte polymer in Examples and Comparative Examples described later was coated on a clear glass plate, dried at 150° C. for about 10 min, and peeled to thereby form a membrane of about 30 μm; the membrane was left in water at 23° C. for about 3 hours, and thereafter left in a room of a relative humidity (RH) of 50% for 24 hours; and then, the equilibrium moisture content was measured.

An 80° C.-vacuum-dried membrane was used as the reference dried membrane.

The equilibrium moisture content was calculated from the mass variation in the electrolyte membrane.

(9) Measurement of a Maximum Moisture Content of an Electrolyte Membrane

A maximum value observed in the equilibrium moisture content measurement described above was measured as a maximum moisture content.

(10) The Breaking Strength

The breaking strength of an electrolyte membrane was measured using a precise universal testing machine AGS-1KNG, made by Shimadzu Corp. according to JIS K7113. A sample was left in a constant-temperature chamber at 23° C. and 65% RH for 12 hours or longer, and thereafter cut out into 5 mm wide and 50 mm long, and provided for the measurement. The measurement was carried out for three samples, and the average was determined.

(11) Charge and Discharge Test

A charge and discharge test was carried out using redox flow secondary batteries of Examples and Comparative Examples described later.

The redox flow secondary battery had a structure in which each of liquid-permeable porous current collector electrodes (for a negative electrode and for a positive electrode) was disposed on either side of a diaphragm (electrolyte membrane); these were held by pressing; one side partitioned by the diaphragm was made a positive electrode cell chamber, and the other side was made a negative electrode cell chamber; and the thicknesses of both the cell chambers were secured by spacers.

The charge and the discharge of the battery were carried out by circulating a positive electrode electrolyte solution composed of a sulfuric acid electrolyte solution comprising tetravalent vanadium ($V^{4+}$) and pentavalent vanadium ($V^{5+}$) to the positive electrode cell chamber, and circulating a negative electrode electrolyte solution comprising trivalent vanadium ($V^{3+}$) and divalent vanadium ($V^{2+}$) to the negative electrode cell chamber.

An aqueous electrolyte solution having a whole vanadium concentration of 2 M/L and a whole sulfate radical concentration of 4 M/L was used; the thicknesses of the positive electrode cell chamber and the negative electrode cell chamber installed were each 5 mm; and a porous felt of 5 mm in thickness and about 0.1 g/cm$^3$ in bulk density composed of a carbon fiber was interposed between the diaphragm (electrolyte membrane) and each of both the porous electrodes. The charge and discharge experiment was carried out at a current density of 80 mA/cm$^2$.

The current efficiency (%) was acquired by calculating a ratio (%) obtained by dividing an amount of discharge electricity by an amount of charge electricity. Both the amounts of electricity depend on the ion permselectivity of the diaphragm and current losses of others.

Since the reduction of the internal resistance, that is, the cell electric resistivity, improves the voltage efficiency, and the improvement of the ion permselectivity and the reduction of the current losses of others improve the current efficiency, these factors become important indices in the redox flow secondary battery.

The cell electric resistivity was determined by using the AC impedance method, and measuring a direct-current resistance value at an AC voltage of 10 mV at a frequency of 20 kHz at the discharge initiation time and multiplying the resistance value by the electrode area.

For the current efficiency and the cell electric resistivity, both values of initial values and values after 200 cycles of the charge and discharge test was carried out were determined.

(12) the Rate of Polymer Impregnation of a Reinforcing Material

For an electrolyte membrane obtained in each of Examples 1 to 9, the rate of polymer impregnation of the reinforcing material layer was determined.

The rate of polyelectrolyte polymer impregnation of a reinforcing material was determined as follows.

An electrolyte membrane was cut-processed along the membrane thickness direction; and a cross-section emerging thereby was observed by a scanning electron microscope (SEM) at a magnification of 30,000× to determine a cross-sectional area of a reinforcing material layer.

Void portions and portions other than those from the acquired image are binarized; and the sum total of the area of the void portions is calculated and the void ratio of the reinforcing material layer is determined from the following expression.

Rate of polymer impregnation of a reinforcing material layer (%)=100−{[the sum total of the void area (μm$^2$)/the cross-sectional area of the reinforcing material layer (μm$^2$)]×100}

The case of an impregnation rate of 95% or higher was rated as "A;" the case of 90% or higher and lower than 95%, as "B;" and the case of lower than 90%, as "C."

Hereinafter, in Examples and Comparative Examples, redox flow secondary batteries were produced and the above-mentioned properties were evaluated.

Example 1

(1) Fabrication of a PFSA Resin Precursor

A 10% aqueous solution of $C_7F_{15}COONH_4$ and pure water were charged in a stainless steel-made stirring-type autoclave, and the interior atmosphere of the autoclave was sufficiently vacuum and replaced by nitrogen; and thereafter, tetrafluoroethylene ($CF_2=CF_2$) (hereinafter, also referred to as "TFE") gas was introduced, and the interior pressure was pressurized to 0.7 MPa in terms of gage pressure.

Then, an ammonium persulfuric acid aqueous solution was injected to initiate the polymerization.

While in order to replenish TFE consumed by the polymerization, TFE gas was continuously fed so as to hold the pressure of the autoclave at 0.7 MPa, $CF_2=CFO(CF_2)_2-SO_2F$ of an amount corresponding to 0.70 times the amount of TFE fed in mass ratio was continuously fed to carry out the polymerization by regulating the polymerization condition in a best range to thereby obtain a perfluorocarbonsulfonic acid (PFSA) resin precursor powder.

The Melt Flow Index (MFI) of the obtained PFSA resin precursor powder (precursor of PFSA resin A1 in Table 1) was 1.5 (g/10 min).

(2) Fabrication of Perfluorocarbonsulfonic Acid Resins and Dispersion Solutions Thereof The obtained PFSA resin precursor powder was brought into contact with an aqueous solution in which potassium hydroxide (15% by mass) and methyl alcohol (50% by mass) were dissolved at 80° C. for 20 hours to thereby subject the precursor polymer to a hydrolysis treatment. Thereafter, the precursor polymer was immersed in water at 60° C. for 5 hours.

Then, such a treatment that the resultant was immersed in a 2 N hydrochloric acid aqueous solution at 60° C. for 1 hour was repeated five times by renewing the hydrochloric acid aqueous solution each time; and thereafter, the resultant was washed with ion-exchange water, and dried.

A PFSA resin having a structure having sulfonic acid groups ($SO_3H$) and represented by the formula (2) (m=2, $X^4$=$SO_3H$) was thereby obtained.

The EW of the obtained PFSA resin A1 was 650 (g/eq).

The obtained PFSA resins were each put in a 5-L autoclave together with an ethanol aqueous solution (water:ethanol=50:50 (in mass ratio)), and the autoclave was hermetically closed; and the mixture was heated up to 160° C. under stirring by a blade, and the temperature was held for 5 hours.

Thereafter, the autoclave was spontaneously cooled, and a homogeneous dispersion liquid of 5% by mass of the PFSA resin was thus fabricated. Then, 100 g of pure water was added to 100 g of the PFSA resin dispersion liquid, and stirred; and thereafter while the dispersion liquid was heated to 80° C. and stirred, the dispersion liquid was concentrated up to 20% by mass in terms of solid content concentration.

The obtained PFSA resin A1 dispersion liquid was named dispersion liquid (ASF1).

(3) Production of a PTFE Microporous Membrane 1

463 mL of a hydrocarbon oil as an extrusion liquid lubricating oil was added to and mixed with 1 kg of a PTFE fine powder having a number-average molecular weight of 6,500,000, at 20° C.

Then, a round bar-shape molded body obtained by paste-extruding the mixture was formed into a film-shape by a calender roll heated to 70° C. to thereby obtain a PTFE film. The film was passed through a hot air drying oven at 250° C. to evaporate and remove the extrusion aid to thereby obtain an unbaked film having an average thickness of 300 μm and an average width of 150 mm.

Then, the unbaked PTFE film was stretched at a stretch ratio of 6.6 times in the longitudinal direction (MD direction), and taken up. Both edges of the obtained MD-direction-stretched PTFE film were pinched by clips; and the film was stretched at a stretch ratio of 8 times in the width direction (TD direction), and subjected to heat setting to thereby obtain a stretched PTFE membrane of 10 μm in thickness. At this time, the stretch temperature was 290° C., and the heat setting temperature was 360° C.

The PTFE microporous membrane produced as described above was made a microporous membrane 1. The distribution center of the pore distribution of the microporous membrane 1 was 1.29 μm.

(4) Production of an Electrolyte Membrane

The dispersion liquid ASF1 was coated on a base material film by using a bar coater (made by Matsuo Sangyo Co., Ltd., Bar No. 200, wet membrane thickness: 200 μm) (coated area: about 200 mm wide x about 500 mm long); thereafter, the PTFE microporous membrane 1 (membrane thickness: 10 μm, porosity: 82%, sample size: 200 mm wide×500 mm long) was laminated on the dispersion liquid in the state of not having been completely dried; and the dispersion liquid and the microporous membrane were pressure-bonded by using a rubber roller on the microporous membrane.

At this time, that the dispersion liquid was filled in a part of the microporous membrane was visually confirmed, and then, this membrane, that is, a laminated body of the PTFE microporous membrane and the base material film, was dried in an oven at 90° C. for 20 min.

Then, the dispersion liquid was again similarly laminated on the PTFE microporous membrane of the obtained membrane to thereby sufficiently fill voids of the microporous membrane with the dispersion liquid; and this membrane was dried in an oven at 90° C. further for 20 min.

The "PTFE microporous membrane sufficiently impregnated with the dispersion liquid" thus obtained was subjected to a heat treatment in an oven at 170° C. for 1 hour to thereby obtain an electrolyte membrane of about 25 μM in membrane thickness.

The evaluation results of the electrolyte membrane are shown in Table 1.

The equilibrium moisture content of the obtained electrolyte membrane was 12% by mass for ASF1.

The maximum moisture content of the electrolyte membrane in water at 25° C. for 3 hours was 23% by mass for ASF1. Here, the maximum moisture content is a maximum value observed in the equilibrium moisture content measurement.

The plane-direction dimensional change of the electrolyte membrane was 14%.

Then, a charge and discharge test was carried out using the electrolyte membrane as a diaphragm of a vanadium redox flow secondary battery.

The charge and discharge test was carried out by using the electrolyte membrane obtained from ASF1 and after the equilibrium was sufficiently reached in the electrolyte solution; and thereafter, after the stable state was made, the initial current resistivity and cell electric resistivity were measured.

The current efficiency/the cell electric resistivity of the electrolyte membrane was (97.5/0.90).

Then, a durability test was carried out by using the electrolyte membrane fabricated using the ASF1 (PFSA resin dispersion liquid) and carrying out 200 cycles of the charge and discharge and examining the variation.

As a result, the current efficiency (%)/the cell electric resistivity ($\Omega \cdot cm^2$) was (97.3/0.90), which gave only a small variation as compared with the current efficiency (%)/the cell electric resistivity ($\Omega \cdot cm^2$) in the initial stage, thus revealing that the electrolyte membrane was excellent in the durability.

Example 2

(1) Production of a PTFE Microporous Membrane 2

300 mL of a hydrocarbon oil as an extrusion liquid lubricating oil was added to and mixed with 1 kg of a PTFE fine powder having a number-average molecular weight of 12,000,000, at 20° C.

Then, a round bar-shape molded body obtained by paste-extruding the mixture was formed into a film-shape by a calender roll heated to 70° C. to thereby obtain a PTFE film. The film was passed through a hot air drying oven at 250° C. to evaporate and remove the extrusion aid to thereby obtain an unbaked film having an average thickness of 200 μm and an average width of 280 mm.

Then, the unbaked PTFE film was stretched at a stretch ratio of 5 times in the longitudinal direction (MD direction), and taken up.

Both edges of the obtained MD-direction-stretched PTFE film were pinched by clips; and the film was stretched at a stretch ratio of 5 times in the width direction (TD direction), and subjected to heat setting to thereby obtain a stretched PTFE membrane of 12 µm in thickness. At this time, the stretch temperature was 290° C., and the heat setting temperature was 360° C. The fabricated PTFE microporous membrane was made a microporous membrane 2. The distribution center of the pore distribution of the PTFE microporous membrane 2 was 1.18 µm.

(2) Production of an Electrolyte Membrane

An electrolyte membrane was obtained by the similar method as in Example 1, except for using the PTFE microporous membrane 2.

The equilibrium moisture content of the obtained electrolyte membrane was 12% by mass, and the maximum moisture content thereof in water at 25° C. for 3 hours was 23% by mass.

The plane-direction dimensional change of the obtained electrolyte membrane was measured, and was 8%, which was a small dimensional change.

As a result of carrying out a charge and discharge test by the similar method as in Example 1, the current efficiency (%)/the cell electric resistivity ($\Omega \cdot cm^2$) in the initial stage was (97.5/0.90).

As a result of carrying out 200 cycles of the charge and discharge as the durability test, the current efficiency/the cell electric resistivity was (97.3%/0.90 $\Omega \cdot cm^2$), giving a very small variation as compared with the current efficiency (%)/the cell electric resistivity ($\Omega \cdot cm^2$) in the initial stage, and exhibiting excellent durability.

Example 3

(1) Production of a PTFE Microporous Membrane 3

A microporous membrane (the distribution center of the pore distribution was 0.2 µm) of 8 µm in thickness was produced by the similar method as for the PTFE microporous membrane 2, and made a PTFE microporous membrane 3, except for stretching at a stretch ratio of 15 times in the longitudinal direction (MD direction) and a stretch ratio of 8 times in the width direction (TD direction).

(2) Production of an Electrolyte Membrane

An electrolyte membrane was obtained by the similar method as in Example 1, except for using the PTFE microporous membrane 3.

The equilibrium moisture content of the obtained electrolyte membrane was 12% by mass, and the maximum moisture content thereof in water at 25° C. for 3 hours was 23% by mass.

The plane-direction dimensional change of the obtained electrolyte membrane was measured, and was 8%, which was a small dimensional change.

As a result of carrying out a charge and discharge test by the similar method as in Example 1, the current efficiency (%)/the cell electric resistivity ($\Omega \cdot cm^2$) in the initial stage was 97.5/0.90.

As a result of carrying out 200 cycles of the charge and discharge as the durability test, the current efficiency/the cell electric resistivity was (97.3%/0.90. ($\Omega \cdot cm^2$), giving a very small variation as compared with the current efficiency (%)/the cell electric resistivity ($\Omega \cdot cm^2$) in the initial stage, and exhibiting excellent durability.

Example 4

(1) Production of a PTFE Microporous Membrane 4

A microporous membrane (the distribution center of the pore distribution was 0.2 µm) of 12 µm in thickness was produced by the similar method as for the PTFE microporous membrane 2, and made a PTFE microporous membrane 4, except for stretching at a stretch ratio of 3 times in the longitudinal direction (MD direction) and a stretch ratio of 8.3 times in the width direction (TD direction).

(2) Production of an Electrolyte Membrane

An electrolyte membrane was obtained by the similar method as in Example 2, except for using the PTFE microporous membrane 4, and altering the membrane thickness of the electrolyte membrane from 20 µm to 25 µm by coating the dispersion liquid by using a bar coater whose wet membrane thickness was different.

The equilibrium moisture content of the obtained electrolyte membrane was 12% by mass, and the maximum moisture content thereof in water at 25° C. for 3 hours was 23% by mass.

The plane-direction dimensional change of the obtained electrolyte membrane was measured, and was 5%, which was a small dimensional change.

As a result of carrying out a charge and discharge test by the similar method as in Example 1, the current efficiency (%)/the cell electric resistivity ($\Omega \cdot cm^2$) was (97.5/0.90).

As a result of carrying out 200 cycles of the charge and discharge as the durability test, the current efficiency/the cell electric resistivity was (97.3%/0.90 $\Omega \cdot cm^2$), giving a very small variation as compared with the current efficiency (%)/the cell electric resistivity ($\Omega \cdot cm^2$) in the initial stage, and exhibiting excellent durability.

Example 5

(Production of an Electrolyte Membrane)

The dispersion liquid ASF1 (PFSA resin dispersion liquid) was coated on a base material film by using a bar coater (made by Matsuo Sangyo Co., Ltd., Bar No. 200, wet membrane thickness: 200 µm) (coated area: about 200 mm wide×about 500 mm long); thereafter, a liquid crystal polymer nonwoven fabric of a whole aromatic polyester (made by Kuraray Co., Ltd., Vecrus MBBK14FXSP) (membrane thickness: 20 µm, porosity: 83%) with the sample size: 200 mm wide×500 mm long was laminated on the dispersion liquid in the state of not having been completely dried; and the dispersion liquid and the nonwoven fabric were pressure-bonded by using a rubber roller on the nonwoven fabric.

At this time, that the dispersion liquid was filled in a part of the nonwoven fabric was visually confirmed, and then, this membrane, that is, a laminated body of the liquid crystal polymer nonwoven fabric of a whole aromatic polyester and the base material film, was dried in an oven at 90° C. for 20 min.

Then, the dispersion liquid was again similarly laminated on the nonwoven fabric of the obtained membrane to thereby sufficiently fill voids of the nonwoven fabric with the dispersion liquid; and this membrane was dried in an oven at 90° C. further for 20 min.

A "nonwoven fabric sufficiently impregnated with the dispersion liquid" thus obtained was subjected to a heat treatment in an oven at 170° C. for 1 hour to thereby obtain an electrolyte membrane of about 40 µm in membrane thickness.

The evaluation results of the electrolyte membrane are shown in Table 1.

The equilibrium moisture content of the obtained electrolyte membrane was 12% by mass for ASF1.

The maximum moisture content of the electrolyte membrane in water at 25° C. for 3 hours was 23% by mass for ASF1. Here, the maximum moisture content is a maximum value observed in the equilibrium moisture content measurement.

The plane-direction dimensional change of the electrolyte membrane was 14%, and the breaking strength was 570 kgf/cm$^2$.

Then, a charge and discharge test was carried out using the electrolyte membrane as a diaphragm of a vanadium redox flow secondary battery. The charge and discharge experiment was carried out by using the electrolyte membrane obtained from ASF1 and after the equilibrium was sufficiently reached in the electrolyte solution; and thereafter, after the stable state was made, the cell electric resistivity and the current efficiency in the initial stage were measured. The current efficiency/the cell electric resistivity of the electrolyte membrane was (97.5%/0.90 Ω·cm$^2$)

Then, a durability test was carried out by using the electrolyte membrane produced using the above ASF1 (PFSA resin dispersion liquid) and carrying out 200 cycles of the charge and discharge and examining the variation.

As a result, the current efficiency (%)/the cell electric resistivity (Ω·cm$^2$) was (97.3%/0.90 Ω·cm$^2$), which gave a very small variation as compared with the current efficiency (%)/the cell electric resistivity (Ω·cm$^2$) in the initial stage, thus revealing that the electrolyte membrane was excellent in the oxidation resistance.

Example 6

An electrolyte membrane was obtained by the similar method as in Example 5, except for using a nonwoven fabric composed of aramid (made by Poval Kogyo Co., Ltd., AH20CC)(membrane thickness: 20 μm, porosity: 90%).

The equilibrium moisture content of the obtained electrolyte membrane was 12% by mass, and the maximum moisture content thereof in water at 25° C. for 3 hours was 23% by mass.

The plane-direction dimensional change of the obtained electrolyte membrane was measured, and was 8%, which was a small dimensional change.

As a result of carrying out a charge and discharge test by the similar method as in Example 1, the current efficiency (%)/the cell electric resistivity (Ω·cm$^2$) was (97.5/0.90).

As a result of carrying out 200 cycles of the charge and discharge as the durability test, the current efficiency/the cell electric resistivity was (97.3%/0.90 Ω·cm$^2$), giving a very small variation as compared with the current efficiency (%)/the cell electric resistivity (Ω·cm$^2$) in the initial stage, and exhibiting excellent durability.

Example 7

An electrolyte membrane was obtained by the similar method as in Example 5, except for using a polyolefin microporous membrane (made by DSM Solutech BV, grade: Solupor 3PO7A, membrane thickness: 8 μm, porosity: 86%).

The equilibrium moisture content of the obtained electrolyte membrane was 13% by mass, and the maximum moisture content thereof in water at 25° C. for 3 hours was 22% by mass.

The plane-direction dimensional change of the obtained electrolyte membrane was measured, and was 11%.

As a result of carrying out a charge and discharge test by the similar method as in Example 1, the current efficiency (%)/the cell electric resistivity (Ω·cm$^2$) was (98.3/0.95).

As a result of carrying out 200 cycles of the charge and discharge as the durability test, the current efficiency/the cell electric resistivity was (98.2%/0.95 Ω·cm$^2$), giving a very small variation as compared with the current efficiency (%)/the cell electric resistivity (Ω·cm$^2$) in the initial stage, and exhibiting excellent durability.

With respect to the multilayer structure of the polyolefin microporous membrane, the polyolefin microporous membrane was cut out into a strip of about 3 mm×15 mm, and subjected to a steam dyeing treatment with ruthenium oxide, thereafter freeze-broken to thereby fabricate a sample for observing the cross-section of the polyolefin microporous membrane.

The broken piece was fixed on a sample stage, and thereafter subjected to an osmium plasma coat treatment (electroconduction treatment) to thereby make a sample for observing the cross-sectional form.

The form observation of the sample for observing the cross-sectional form was carried out using an SEM (made by Hitachi, Ltd., product No. S-4700, acceleration voltage: 5 kV, detector: secondary electron detector, reflection electron detector), and that the sample had a multilayer structure was observed from the observed image. That a microporous membrane has a multilayer structure can suppress the dimensional change, and can enhance the membrane strength. Further since impregnation with an electrolyte solution is performed and the stress apt to change the volume is properly dispersed, an improving effect of the durability can be provided.

Example 8

(1) Production of a PFSA Resin Dispersion Liquid (ASF2)

The PFSA resin obtained in Example 1 was put in a 5-L autoclave together with an ethanol aqueous solution (water: ethanol=85:15 (in mass ratio)), and the autoclave was hermetically closed; and the mixture was heated up to 160° C. under stirring by a blade, and the temperature was held for 5 hours.

Thereafter, the autoclave was spontaneously cooled, and a homogeneous dispersion liquid of 5% by mass of the PFSA resin was thus prepared.

Then, 100 g of pure water was added to 100 g of the PFSA resin dispersion liquid, and stirred; and thereafter while the dispersion liquid was heated to 80° C. and stirred, the dispersion liquid was concentrated up to 20% by mass in terms of solid content concentration.

The obtained dispersion liquid of the PFSA resin A1 was made a dispersion liquid (ASF2).

(2) Production of an Electrolyte Membrane

An electrolyte membrane was obtained by the similar method as in Example 1 and by using the same reinforcing material as in Example 1, except for using the dispersion liquid ASF2.

The equilibrium moisture content of the obtained electrolyte membrane was 14% by mass, and the maximum moisture content thereof in water at 25° C. for 3 hours was 26% by mass.

The plane-direction dimensional change of the obtained electrolyte membrane was measured, and was 16%.

As a result of carrying out a charge and discharge test by the similar method as in Example 1, the current efficiency (%)/the cell electric resistivity (Ω·cm$^2$) in the initial stage was 95.0/0.95.

As a result of carrying out 200 cycles of the charge and discharge as the durability test, the current efficiency/the cell electric resistivity was (92.1%/1.05 Ω·cm$^2$), which exhibited a very small variation as compared with the current efficiency (%)/the cell electric resistivity (Ω·cm$^2$) in the initial stage, thus revealing that the electrolyte membrane was excellent in the durability.

Example 9

(Production of an Electrolyte Membrane)

An electrolyte membrane was obtained by using the same reinforcing material as in Example 5 and by the similar method as in Example 5, except for using the dispersion liquid ASF2.

The equilibrium moisture content of the obtained electrolyte membrane was 16% by mass, and the maximum moisture content thereof in water at 25° C. for 3 hours was 27% by mass.

The plane-direction dimensional change of the obtained electrolyte membrane was measured, and was 17%.

As a result of carrying out a charge and discharge test by the similar method as in Example 1, the current efficiency (%)/the cell electric resistivity ($\Omega \cdot cm^2$) in the initial stage was 95.5/0.95.

As a result of carrying out 200 cycles of the charge and discharge as the durability test, the current efficiency/the cell electric resistivity was (91.7%/1.05 $\Omega \cdot cm^2$), giving a very small variation as compared with the current efficiency (%)/the cell electric resistivity ($\Omega \cdot cm^2$) in the initial stage, and exhibiting excellent durability.

Example 10

An electrolyte membrane was obtained by the similar method as in Example 5, except for using a woven fabric using a PTFE fiber and fabricated by plain weave.

The equilibrium moisture content of the obtained electrolyte membrane was 13% by mass, and the maximum moisture content thereof in water at 25° C. for 3 hours was 22% by mass.

The plane-direction dimensional change of the obtained electrolyte membrane was measured, and was 14%.

As a result of carrying out a charge and discharge test by the similar method as in Example 1, the current efficiency (%)/the cell electric resistivity ($\Omega \cdot cm^2$) was (97.0/0.95).

As a result of carrying out 200 cycles of the charge and discharge as the durability test, the current efficiency/the cell electric resistivity was (96.8%/0.95 $\Omega \cdot cm^2$), giving a very small variation as compared with the current efficiency (%)/the cell electric resistivity ($\Omega \cdot cm^2$) in the initial stage, and exhibiting excellent durability.

Comparative Example 1

(Production of an Electrolyte Membrane)

The dispersion liquid (ASF1) prepared in Example 1 was cast on a polyimide film as a carrier sheet by a well-known usual method, and exposed to hot air at 120° C. (20 min) to nearly completely evaporate the solvent to dry the dispersion liquid to thereby form a membrane.

This membrane was further subjected to a heat treatment in a hot air atmosphere under the condition of 160° C. for 10 min to thereby obtain an electrolyte membrane of 20 μm in membrane thickness.

The equilibrium moisture content of the obtained electrolyte membrane was 12% by mass, and the maximum moisture content thereof in water at 25° C. for 3 hours was 23% by mass.

The plane-direction dimensional change of the obtained electrolyte membrane was measured, and was 24%.

As a result of carrying out a charge and discharge test by the similar method as in Example 1, the current efficiency (%)/the cell electric resistivity ($\Omega \cdot cm^2$) was 93.0/0.85, which was in a lower level than in Examples.

As a result of carrying out 200 cycles of the charge and discharge as the durability test, the current efficiency/the cell electric resistivity was (84.4%/1.20 $\Omega \cdot cm^2$), giving a large variation as compared with the current efficiency (a)/the cell electric resistivity ($\Omega \cdot cm^2$) in the initial stage, and exhibiting inferior durability as well.

The measurement results of physical properties of the above Examples 1 to 9 and Comparative Example 1 are shown in Table 1.

TABLE 1

| | Polyelectrolyte Polymer | | | Reinforcing Material | | | | | Polyelectrolyte Membrane | | |
|---|---|---|---|---|---|---|---|---|---|---|---|
| | | | | | Pore | | | | | | |
| | Polymer | MFI (g/10 min) | Equivalent Weight (g/eq) | Material | Membrane Thickness (μm) | Distribution (presence ratio) | Elastic Modulus (MPa) | Porosity (%) | Composition | Membrane Thickness (μm) | Breaking Strength kgf/cm² |
| Example 1 | A1 | 1.5 | 650 | PTFE | 10 | 1.00 | MD/TD 25/17 | 82 | ASF1 | 25 | — |
| Example 2 | A1 | 1.5 | 650 | PTFE | 12 | 1.00 | MD/TD 400/200 | 90 | ASF1 | 20 | — |
| Example 3 | A1 | 1.5 | 650 | PTFE | 8 | 1.00 | MD/TD 400/200 | 90 | ASF1 | 20 | — |
| Example 4 | A1 | 1.5 | 650 | PTFE | 12 | 1.00 | MD/TD 200/450 | 90 | ASF1 | 25 | — |
| Example 5 | A1 | 1.5 | 650 | aromatic polyester | 20 | — | — | 83 | ASF1 | 40 | 570 |
| Example 6 | A1 | 1.5 | 650 | aramid | 20 | — | — | 90 | ASF1 | 25 | 1700 |
| Example 7 | A1 | 1.5 | 650 | polyolefin | 8 | — | — | 86 | ASF1 | 20 | 720 |
| Example 8 | A1 | 1.5 | 650 | PTFE | 10 | 1.00 | MD/TD 25/17 | 82 | ASF2 | 30 | — |
| Example 9 | A1 | 1.5 | 650 | aromatic polyester | 20 | — | — | 83 | ASF2 | 45 | — |
| Example 10 | A1 | 1.5 | 650 | PTFE | 27 | — | — | 75 | ASF1 | 45 | — |
| Comparative Example 1 | A1 | 1.5 | 650 | — | — | — | — | — | ASF1 | 20 | — |

TABLE 1-continued

|  | Polyelectrolyte Membrane | | | Charge and Discharge Test of Redox Flow Battery | | | | | |
|---|---|---|---|---|---|---|---|---|---|
|  | Dimensional Change (in Plane Direction) (%) | Membrane Equilbrium Moisture Content (mass %) | Membrane Maximum Moisture Content (25° C.) (mass %) | Membrane Thickness of Electrolyte Membrane (μm) | Current Efficiency (%) (initial) | Cell Electric Resistivity ($\Omega \cdot cm^2$) (initial) | Current Efficiency (%) (after 200 cycles) | Cell Electric Resistivity ($\Omega \cdot cm^2$) (after 200 cycles) | Rate of Polymer Impregnation of Reinforcing Material Layer |
| Example 1 | 14 | 12 | 23 | 25 | 97.5 | 0.90 | 97.3 | 0.90 | A |
| Example 2 | 8 | 12 | 23 | 20 | 97.5 | 0.90 | 97.3 | 0.90 | A |
| Example 3 | 8 | 12 | 23 | 20 | 97.5 | 0.90 | 97.3 | 0.90 | A |
| Example 4 | 5 | 12 | 23 | 25 | 97.5 | 0.90 | 97.3 | 0.90 | A |
| Example 5 | 14 | 12 | 23 | 40 | 97.5 | 0.90 | 97.3 | 0.90 | B |
| Example 6 | 8 | 12 | 23 | 25 | 97.5 | 0.90 | 97.3 | 0.90 | B |
| Example 7 | 11 | 13 | 22 | 20 | 98.3 | 0.90 | 98.2 | 0.95 | B |
| Example 8 | 16 | 14 | 26 | 30 | 95.0 | 0.95 | 92.1 | 1.05 | C |
| Example 9 | 17 | 16 | 27 | 45 | 95.0 | 0.95 | 91.7 | 1.05 | C |
| Example 10 | 14 | 13 | 22 | 45 | 97.0 | 0.95 | 96.8 | 0.95 | B |
| Comparative Example 1 | 24 | 12 | 23 | 20 | 93.0 | 0.85 | 84.4 | 1.20 | — |

The present application is based on Japanese Patent Application (Japanese Patent Application Nos. 2011-290020), filed on Dec. 28, 2011 in the Japan Patent Office, a Japanese Patent Application (Japanese Patent Application No. 2012-010454), filed on Jan. 20, 2012 in the Japan Patent Office, the entire content of which are hereby incorporated by reference.

INDUSTRIAL APPLICABILITY

The electrolyte membrane according to the present invention is industrially applicable as a diaphragm for a redox flow secondary battery.

REFERENCE SIGNS LIST

1 POSITIVE ELECTRODE
2 POSITIVE ELECTRODE CELL CHAMBER
3 NEGATIVE ELECTRODE
4 NEGATIVE ELECTRODE CELL CHAMBER
5 ELECTROLYTE MEMBRANE
6 ELECTROLYTIC BATH
7 POSITIVE ELECTRODE ELECTROLYTE SOLUTION TANK
8 NEGATIVE ELECTRODE ELECTROLYTE SOLUTION TANK
9 AC/DC CONVERTER

The invention claimed is:

1. A redox flow secondary battery comprising:
an electrolytic bath comprising:
a positive electrode cell chamber comprising a positive electrode composed of a carbon electrode;
a negative electrode cell chamber comprising a negative electrode composed of a carbon electrode; and
an electrolyte membrane as a diaphragm to separate the positive electrode cell chamber and the negative electrode cell chamber,
wherein the positive electrode cell chamber comprises a positive electrode electrolyte solution comprising an active substance; and the negative electrode cell chamber comprises a negative electrode electrolyte solution comprising an active substance;
wherein the redox flow secondary battery charges and discharges based on changes in valences of the active substances in the electrolyte solutions;
wherein the electrolyte membrane comprises an ion-exchange resin composition comprising a polyelectrolyte polymer as a main component;
wherein the polyelectrolyte polymer is a perfluorocarbonsulfonic acid resin (PFSA) being a fluorine-based polyelectrolyte polymer having a structure represented by the following formula (2):

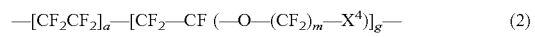

$$—[CF_2CF_2]_a—[CF_2—CF(—O—(CF_2)_m—X^4)]_g— \quad (2)$$

wherein a and g represent numbers satisfying $0 \leq a < 1$, $0 < g \leq 1$, and $a+g=1$; m represents an integer of 1 to 6; and $X^4$ represents $SO_3H$; and
wherein the electrolyte membrane has a reinforcing material composed of at least one of a fluorine-based microporous membrane, a fluorine-based nonwoven fabric, and a fluorine-based woven fabric, wherein the reinforcing material has a structure in which the reinforcing material is impregnated with the polyelectrolyte polymer and the reinforcing material is impregnated at a rate of 95% or higher.

2. The redox flow secondary battery according to claim 1, wherein an internal volume of the reinforcing material is substantially occluded.

3. The redox flow secondary battery according to claim 1, wherein the redox flow secondary battery is a vanadium-type redox flow secondary battery using sulfuric acid electrolyte solutions comprising vanadium as the positive electrode electrolyte solution and the negative electrode electrolyte solution.

4. The redox flow secondary battery according to claim 1, wherein the polyelectrolyte polymer has an equivalent weight EW (dry mass in grams per equivalent of ion-exchange groups) of 300 to 1,300 g/eq; and the electrolyte membrane has an equilibrium moisture content of 5 to 80% by mass.

5. The redox flow secondary battery according to claim 1, wherein the ion-exchange resin composition comprises 0.1 to 20 parts by mass of a polyphenylene ether resin and/or a polyphenylene sulfide resin with respect to 100 parts by mass of the polyelectrolyte polymer.

6. An electrolyte membrane for a redox flow secondary battery, comprising:
   an ion-exchange resin composition comprising:
      a polyelectrolyte polymer as a main component,
      wherein the polyelectrolyte polymer is a perfluorocarbonsulfonic acid resin (PFSA) being a fluorine-based polyelectrolyte polymer having a structure represented by the following formula (2):

$$-[CF_2CF_2]_a-[CF_2-CF(-O-(CF_2)_m-X^4)]_g-\quad(2)$$

wherein a and g represent numbers satisfying $0 \leq a < 1$, $0 < g \leq 1$, and $a+g=1$; m represents an integer of 1 to 6; and $X^4$ represents $SO_3H$, and having a reinforcing material composed of at least one of a fluorine-based nonwoven fabric, a fluorine-based microporous membrane, and a fluorine-based woven fabric, wherein the reinforcing material has a structure in which the reinforcing material is impregnated with the polyelectrolyte polymer and the reinforcing material is impregnated at a rate of 95% or higher.

7. The electrolyte membrane for the redox flow secondary battery according to claim 6, wherein an internal volume of the reinforcing material for the redox flow secondary battery is substantially occluded.

8. The electrolyte membrane for the redox flow secondary battery according to claim 6, wherein the polyelectrolyte polymer has an equivalent weight EW (dry mass in grams per equivalent of ion-exchange groups) of 300 to 1,300 g/eq; and the electrolyte membrane has an equilibrium moisture content of 5 to 80% by mass.

9. The electrolyte membrane for the redox flow secondary battery according to claim 6, wherein the ion-exchange resin composition comprises 0.1 to 20 parts by mass of a polyphenylene ether resin and/or a polyphenylene sulfide resin with respect to 100 parts by mass of the polyelectrolyte polymer.

10. The electrolyte membrane for the redox flow secondary battery according to claim 6, wherein the electrolyte membrane for the redox flow secondary battery is subjected to a heat treatment at 130 to 200° C. for 1 to 60 min.

* * * * *